United States Patent
Peng

(10) Patent No.: US 10,061,088 B1
(45) Date of Patent: Aug. 28, 2018

(54) OPTICAL SPATIAL MODE FILTER FOR REMOVING FUNDAMENTAL MODE COMPONENTS IN A HAMR LIGHT PATH

(71) Applicant: Seagate Technology LLC, Cupertino, CA (US)

(72) Inventor: Chubing Peng, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/831,722

(22) Filed: Dec. 5, 2017

Related U.S. Application Data

(60) Provisional application No. 62/443,287, filed on Jan. 6, 2017.

(51) Int. Cl.
| | | |
|---|---|---|
| *G11B 11/00* | (2006.01) | |
| *G02B 6/35* | (2006.01) | |
| *G11B 5/48* | (2006.01) | |
| *G11B 11/105* | (2006.01) | |
| *G11B 13/04* | (2006.01) | |
| *G02B 6/02* | (2006.01) | |
| *G02B 6/26* | (2006.01) | |
| *G11B 5/00* | (2006.01) | |

(52) U.S. Cl.
CPC ....... *G02B 6/3532* (2013.01); *G02B 6/02076* (2013.01); *G02B 6/262* (2013.01); *G11B 5/4866* (2013.01); *G11B 11/10539* (2013.01); *G11B 11/10595* (2013.01); *G11B 13/045* (2013.01); *G11B 2005/0021* (2013.01)

(58) Field of Classification Search
CPC ...... G11B 11/10554; G11B 2005/0021; G11B 11/10595; G11B 5/314; G11B 5/6088; G11B 11/10558; G11B 11/10548; G11B 2005/0005; G11B 11/1058
USPC ..... 369/13.13, 13.14, 13.33, 13.34; 360/328, 360/59
See application file for complete search history.

(56) References Cited

U.S. PATENT DOCUMENTS

| | | | |
|---|---|---|---|
| 5,513,196 A | * | 4/1996 | Bischel .................. H01S 5/141 372/102 |
| 8,570,844 B1 | | 10/2013 | Yuan et al. |
| 2007/0058686 A1 | | 3/2007 | Capasso et al. |

FOREIGN PATENT DOCUMENTS

JP 3948318 7/2007

* cited by examiner

*Primary Examiner* — Nabil Hindi
(74) *Attorney, Agent, or Firm* — Hollingsworth Davis, LLC

(57) ABSTRACT

A first waveguide portion receives light from an energy source in a fundamental transverse electric ($TE_{00}$) mode. A mode converter converts a portion of the light to higher-order transverse electric ($TE_{10}$) mode. A second waveguide portion receives the light at the $TE_{10}$ mode and delivers the light to a near-field transducer that heats a recording medium in response thereto. An optical spatial mode filter prevents remnant light in the $TE_{00}$ mode from affecting the recording medium while passing the light at the $TE_{10}$ mode.

20 Claims, 21 Drawing Sheets

OPTICAL SPATIAL MODE FILTER FOR REMOVING FUNDAMENTAL MODE COMPONENTS IN A HAMR LIGHT PATH

RELATED PATENT DOCUMENTS

This application claims the benefit of Provisional Patent Application Ser. No. 62/443,287, filed on Jan. 6, 2017, to which priority is claimed pursuant to 35 U.S.C. § 119(e), and which is incorporated herein by reference in its entirety.

SUMMARY

The present disclosure is directed to an optical filter for removing fundamental mode components in a heat-assisted magnetic recording light path. In one embodiment, an apparatus includes a first waveguide portion configured to receive light from an energy source in a fundamental transverse electric ($TE_{00}$) mode. A mode converter is coupled to the first waveguide portion and configured to convert the light to higher-order transverse electric ($TE_{10}$) mode. A second waveguide portion is configured to receive the light at the $TE_{10}$ mode and deliver the light to a near-field transducer that heats a recording medium in response thereto. The apparatus includes an optical spatial mode filter that prevents the remnant $TE_{00}$ mode from affecting the recording performance while passing the light at the $TE_{10}$ mode.

In another embodiment, an apparatus includes a first waveguide portion configured to receive light from an energy source in a fundamental transverse electric mode ($TE_{00}$). A polarization rotator is coupled to the first waveguide portion and configured to convert the light to transverse magnetic mode (TM). A second waveguide portion is configured to receive the light at the TM mode and deliver the light to a near-field transducer that heats a recording medium in response thereto. The apparatus includes an array of dipole antennas, a periodic dielectric Bragg grating/photonic crystal, or a directional coupler in the second waveguide portion that prevents the remnant $TE_{00}$ mode from affecting the recording medium while passing the light at the TM mode.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer concentrates optical energy into a tiny optical spot in a recording layer, which raises the media temperature locally, reducing the writing magnetic field required for high-density recording. A waveguide delivers light to the near-field transducer and excites the near-field transducer.

Light from a light source, such as an edge-emitting laser diode, is coupled into a HAMR waveguide through waveguide input coupler or a spot size converter. In current configurations, the laser diode is mounted on a magnetic slider in such a way that a transverse electric (TE) polarized light source excites a TE waveguide mode in the slider waveguide while a transverse magnetic (TM) polarized light source excites a TM waveguide mode. The near-field transducer is designed to adapt the light delivery.

Figure 3:
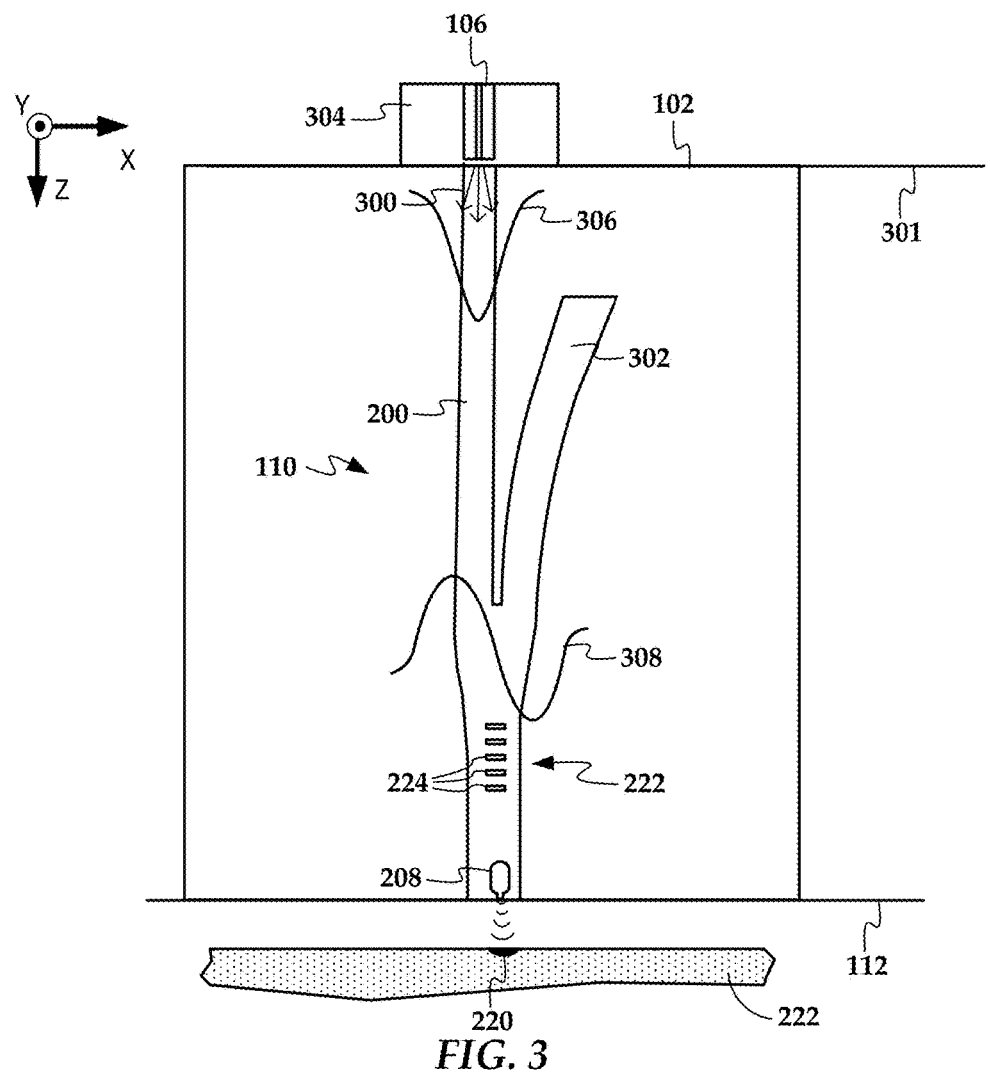
FIG. 3 is a wafer plane view of a slider according to an example embodiment.

One light delivery arrangement uses a first-higher order transverse electric waveguide mode, $TE_{10}$. A $TE_{10}$ mode is usually formed from a fundamental transverse electric mode ($TE_{00}$) by a mode order converter. For example, FIG. 3 shows one configuration to form a $TE_{10}$ mode by a branch waveguide. Other forms of mode order converter include $TE_{00}$-$TE_{10}$ directional couplers, MMI (multi-mode interference) couplers, and waveguide bends. This conversion is usually not 100%. There will be some amount of $TE_{00}$ mode residing in the output waveguide, which mixes with the desired $TE_{10}$ mode. For instance, the design shown in FIG.

3 may yield ~0.5% $TE_{00}$ mode. Deviations from the design specification in fabrication process will also increase the amount of $TE_{00}$ mode, particularly wafer-to-wafer variation. Measurement on wafers showed that the amount of $TE_{00}$ mode could reach up to 3%. This remnant $TE_{00}$ mode, even small, may cause asymmetric ATI (adjacent track interferences) in the recording, which affects the track squeeze capability, degrading the recorded track density. So it is desired to mitigate or eliminate the amount of $TE_{00}$ mode, to, for instance, below 1%.

Another light delivery arrangement uses a fundamental transverse magnetic mode, $TM_{00}$. Light delivery with a $TM_{00}$ mode may make the integration between a near-field transducer and a magnetic pole easier, which provides certain benefits such as lower sensitivity in the near-field transducer dimension, lower temperature rise in the magnetic pole, and lower sensitivity in slider lapping. However, a laser diode is usually TE polarized, with the electric field parallel to the diode waveguide junction. A TM polarized laser diode provides only limited choices in emission wavelength ($\lambda$) for optimization in the near-field transducer performance. Above light wavelength $\lambda$=800 nm, $\lambda$=808 nm is the only available choice in TM polarized diode laser. The next available TM light source will be $\lambda$=1500 nm. To surmount this dilemma, a TE-to-TM polarization rotator is used, which converts a $TE_{00}$ mode to a $TM_{00}$ mode in the light delivery path. A polarization rotator is usually imperfect, partially due to variations in fabricated device dimensions. It is often the case that there will be ~5% $TE_{00}$ mode residing in the waveguide afterward. This residual $TE_{00}$ mode is not preferred, which degrades the recording performance, for instance, increasing thermal background, increasing NFT temperature, increasing laser-induced local slider protrusion.

This disclosure relates to mitigating or eliminating the residual $TE_{00}$ mode from the light path for improving heads recording performance and wafer yield. Generally, a spatial optical filter can be used to remove the residual components. A spatial mode filter is an optical device which uses the principles of Fourier optics to alter the structure of a beam of light, in this case filtering a fundamental mode from coherent laser light. Embodiments may include an array of plasmonic dipole antenna, a periodic dielectric Bragg grating or generally a photonic crystal, a MMI (multi-mode interference) splitter and combiner, a directional coupler, and a light-absorbing metallic or semiconducting wire. These embodiments may be used with TM or TE light delivery in a HAMR read/write head.

Figure 1:
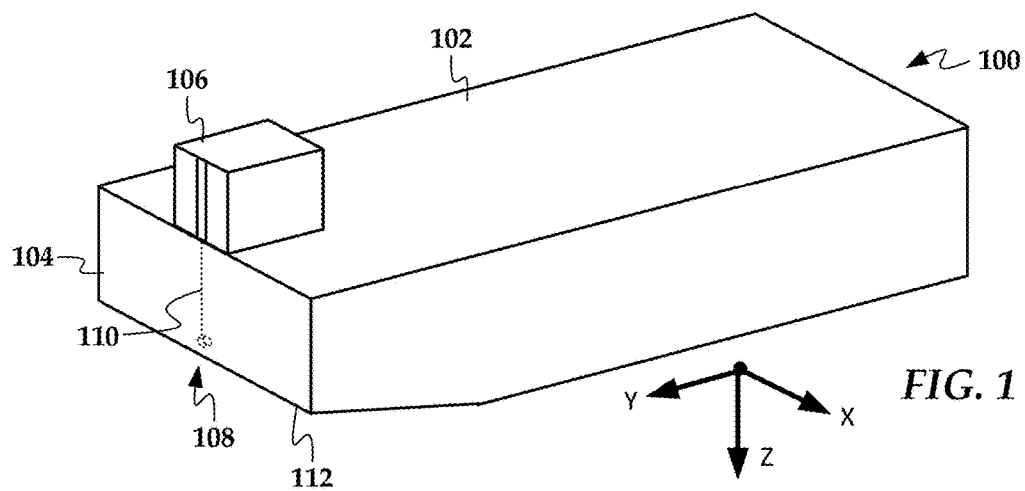
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
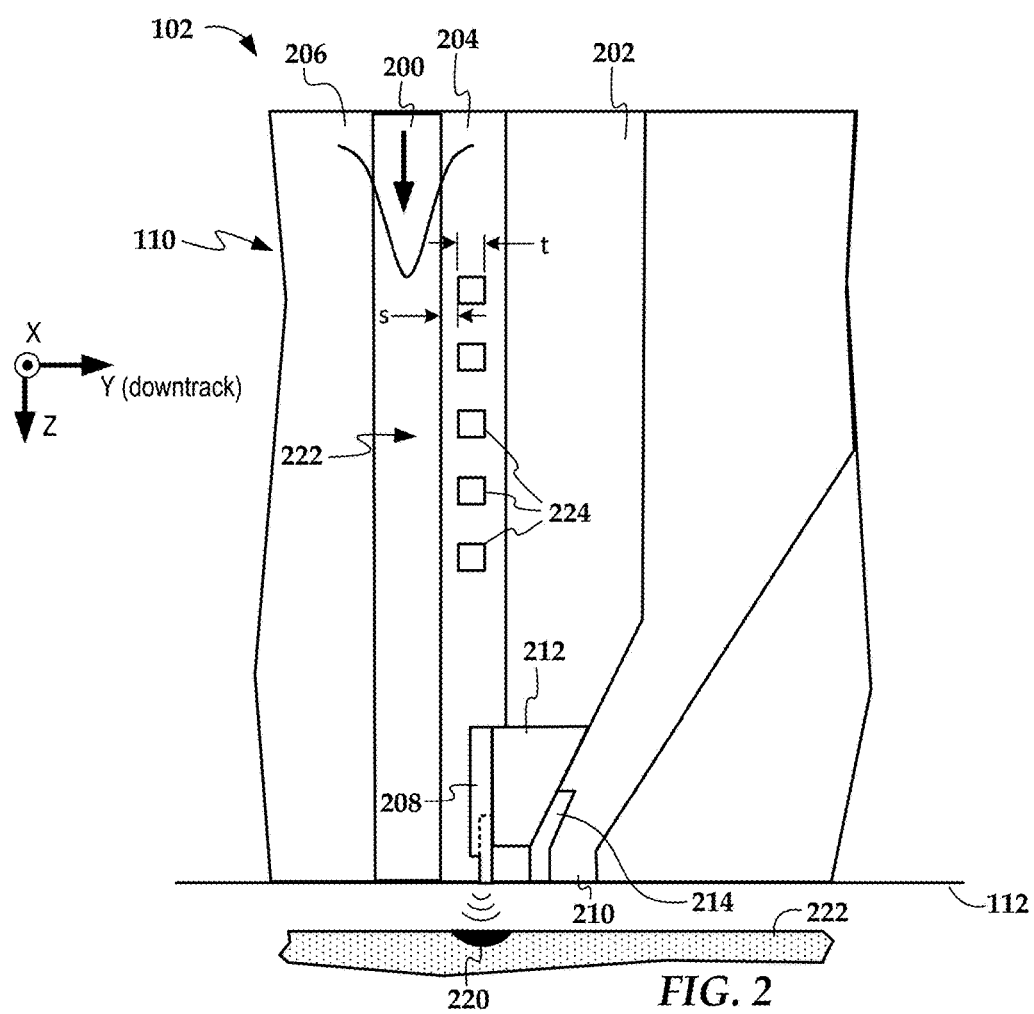
FIG. 2 is a cross-sectional view of a slider along a down-track plane according to according to an example embodiment.

In FIGS. 2 and 3, cross-sectional views show details of a slider body 102 according to an example embodiment. As best seen in FIG. 2, the waveguide 110 includes a core 200, top cladding layer 202, side cladding layer 204, and bottom cladding 206. As seen in FIG. 3, a waveguide input coupler 300 at a top surface 301 of the slider body 102 couples light from the light source 106 to the waveguide 110, the light source 106 being mounted to the slider body 102 via a submount 304. The waveguide input coupler 300 receives light from the light source 106 and transfers the light to the core 200. As it extends away from the light source 106, the core 200 tapers from narrower to wider width (width in this case is the core's x-dimension). The waveguide core 200 is made of dielectric materials of high index of refraction, for instance, AlN (aluminum nitride), $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon).

Figure 4:
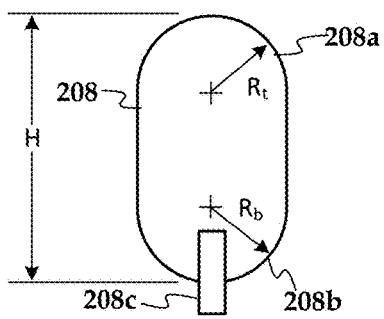
FIG. 4 is a close up view of the near-field transducer of FIG. 3.
Figure 5:
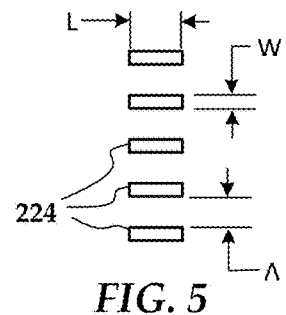
FIG. 5 is a close up view of the dipole antenna array of FIG. 3.

A branch waveguide 302 splits off of the main core 200 and converts the fundamental transverse electric waveguide mode ($TE_{00}$), as indicated by mode profile 306, to a first-higher-order transverse electric mode ($TE_{10}$), as indicated by mode profile 308. The NFT 208 is designed for $TE_{10}$ coupling. As seen in the detail view of FIG. 4, The NFT 208 has two curved ends 208a-b and a protruded peg 208c. In other configurations, one or both of the ends 208a-b may be flattened.

In reference again to FIG. 2, the NFT 208 is placed at the side and top cladding layers 204, 202 of the waveguide and near the waveguide core 200. The cladding layers 202, 204, 206 are each formed of a dielectric material having a refractive index lower than the core 200. The cladding can be, for instance, $Al_2O_3$ (aluminum oxide), SiO and $SiO_2$ (silica). The core 200 delivers light to an NFT 208 that is located within the side cladding layer 204 at the media-facing surface 112. A write pole 210 is located near the NFT 208. A heat sink 212 thermally couples the NFT 208 to the write pole 210. A diffusion barrier 214 is shown between the heat sink 212 and the write pole. A magnetic coil (not shown) induces a magnetic field through the write pole 210 in response to an applied current. During recording, the NFT 208 forms a hotspot 220 within a recording layer of a moving recording medium 222. The write pole 210 sets a magnetic orientation in the hotspot 220, thereby writing data to the recording medium.

The HAMR writer configuration shown in FIGS. 2 and 3 uses a first-higher transverse electric mode ($TE_{10}$) light delivery and an array of plasmonic dipole antenna for eliminating the remnant fundamental transverse electric waveguide mode ($TE_{00}$) in the output waveguide. Light, emitting from a laser diode, is coupled into a three-dimensional single mode ($TE_{00}$) channel waveguide by a waveguide input coupler. The excited fundamental mode, $TE_{00}$, is converted into the first higher order mode, $TE_{10}$, with the assisted branch waveguide 302. The NFT 208 interacts with the incident light at the $TE_{10}$ waveguide mode, generating local surface plasmon along the circumference of the NFT 208. The charges are funneled into the peg 208c, resulting in lightning effect. For efficient NFT excitation, the $TE_{10}$ waveguide cross-section dimension and shape of the NFT, including the end curvature/shape and NFT height as well as peg dimension need optimized. The embodiment described herein may be used with light delivery systems using other forms of $TE_{00}$-to-$TE_{10}$ mode order converter, such as directional couplers, multi-mode interference (MMI) devices, and waveguide bends.

There will be some amount of $TE_{00}$ mode residing in the output waveguide, which mixes with the desired $TE_{10}$ mode.

For instance, the design shown in FIGS. 2 and 3 will remain 0.5% $TE_{00}$ mode in the output waveguide. Deviations from the design specification in fabrication process will also increase the amount of $TE_{00}$ mode. Measurement on wafers showed that the amount of $TE_{00}$ mode could reach up to 3%. This remnant $TE_{00}$ mode causes asymmetric adjacent track interference (ATI), which affects the capability in track squeeze, degrading the recorded track density. Ideally it is desirable to filter out the $TE_{00}$ mode with the least loss in the $TE_{10}$ mode. Also the apparatus should have low sensitivity in the range of light wavelengths of interest and will not present additional reflection back into the light source cavity.

Filtering out a higher-order mode in a waveguide is not difficult due to its weak confinement. Higher order modes can be filtered, for instance, by tapering the waveguide down to the cut-off width of the higher order mode or stripping the higher order mode in an appropriately designed waveguide bend. Filtering out the fundamental mode while passing a higher-order mode with low insertion loss, high extinction ratio and compact size, however, is not trivial.

As seen in FIGS. 2 and 3, an array 222 of plasmonic dipole antenna or wires 224 can be used to mitigate the remnant $TE_{00}$ mode in the output waveguide with little penalty to other key parameters. These key parameters include insertion loss in $TE_{10}$ mode, feedback to the light source cavity, and bandwidth in light wavelength. The array 222 is integrated in one of claddings 202, 204, 206 of the waveguide and above (or below, or both) the middle of waveguide core 200. The array 222 could be periodic or non-periodic. The shape of each wire or antenna 224 could be rectangular and elliptic in yz plane. The wires/antennas 224 are preferably elongated along the dominant transverse electric field direction, which, in FIGS. 2 and 3, is parallel to the x-direction, which corresponds to the cross-track direction.

The material for each wire or antenna 224 is plasmonic, which has negative permittivity in its real part. These include but not limited to, noble metals (Au, Ag, Cu, Rh, Ir, Pt, Pd, etc), nitride-alloys (TiN, TaN, BN, ZrN), magnesium (Mn), graphene, transparent conducting oxides, and transition and alkali metals. Each wire or antenna 224 interacts with the $TE_{00}$ mode by exciting dipole surface plasmonic resonance, which efficiently scatters and absorbs the $TE_{00}$ mode.

Figure 6:
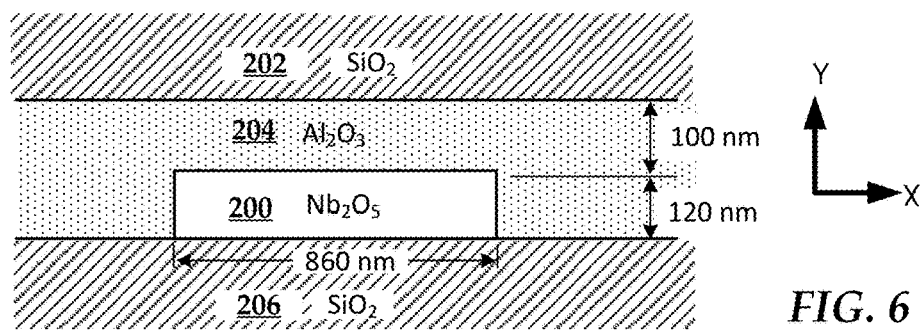
FIG. 6 is a cross-sectional view of the waveguide of FIG. 3.
Figure 7:
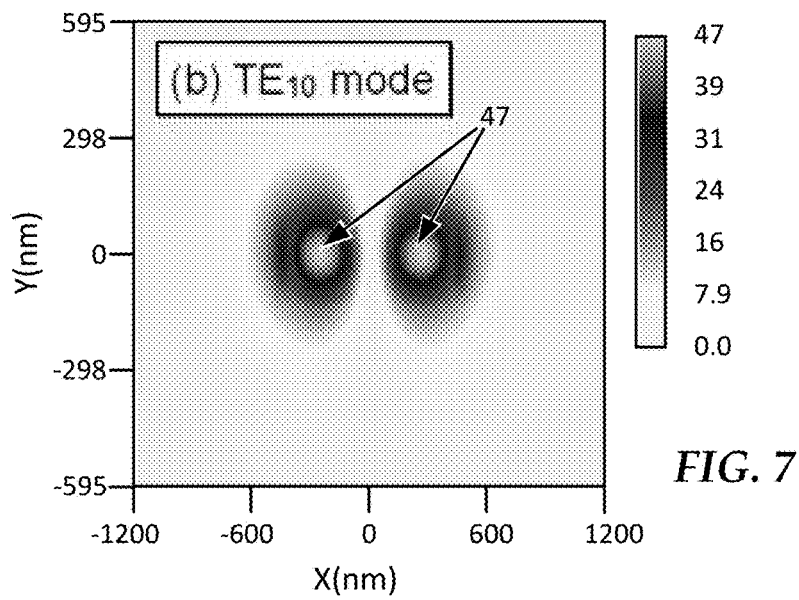
FIGS. 7 and 8 are field contour plots of light coupled into a waveguide according to an example embodiment.
Figure 8:
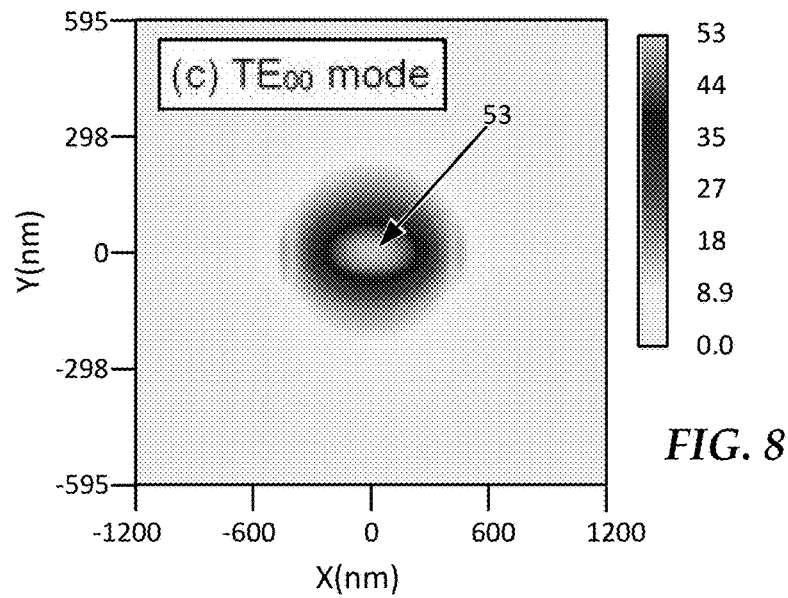

As an example to demonstrate the functionality, it is assumed that a waveguide is formed of a 120-nm thick $Nb_2O_5$ core 200, an $Al_2O_3$ as the side cladding 204 and $SiO_2$ as top and bottom cladding 202, 206. Particulars of this waveguide arrangement are shown in the cross-sectional diagram of FIG. 6. Light wavelength in free space $\lambda_0$=830 nm. The index of refraction is n=2.29 for $Nb_2O_5$, 1.63 for the $Al_2O_3$, and 1.46 for the $SiO_2$. The antenna for the $TE_{00}$ elimination is a rectangular Rh (Rhodium) wire, which has a complex refractive index n=2.98+j 7.46. It is placed in the cladding 204. A mixture of $TE_{10}$ and $TE_{00}$ mode is injected into the channel waveguide. The input power is 0.5 for both $TE_{10}$ and $TE_{00}$ mode. The contour plots in FIGS. 7 and 8 show profiles of the dominant transverse electric field amplitude ($E_x$) of $TE_{10}$ and $TE_{00}$ mode. After propagating through the waveguide in the presence of the wire array, the mode power in the $TE_{10}$ and $TE_{00}$ is evaluated.

Figure 9:
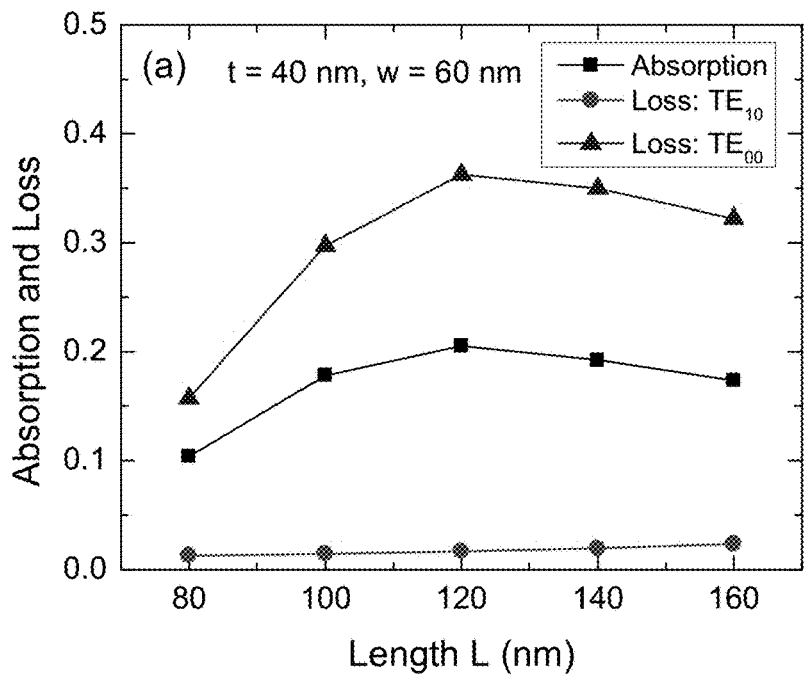
FIGS. 9, 10, 11, and 12 are graphs showing performance of a dipole antenna array according to example embodiments.
Figure 10:
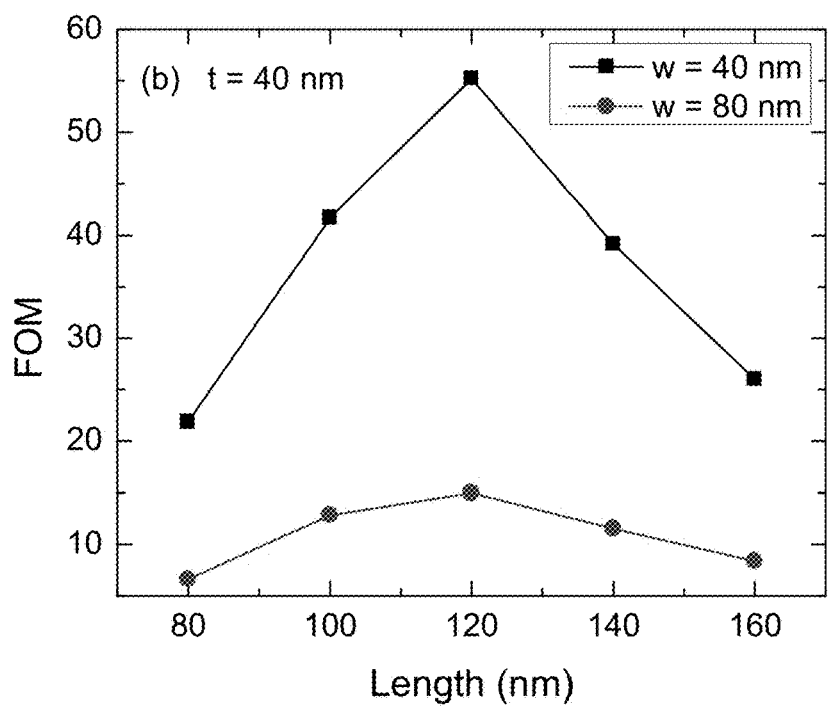
Figure 11:
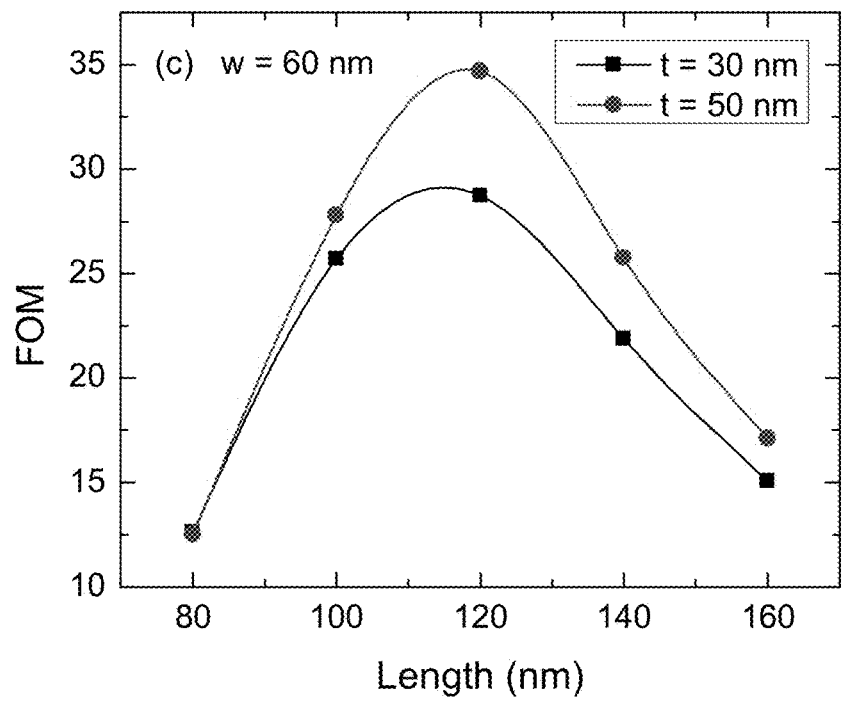
Figure 12:
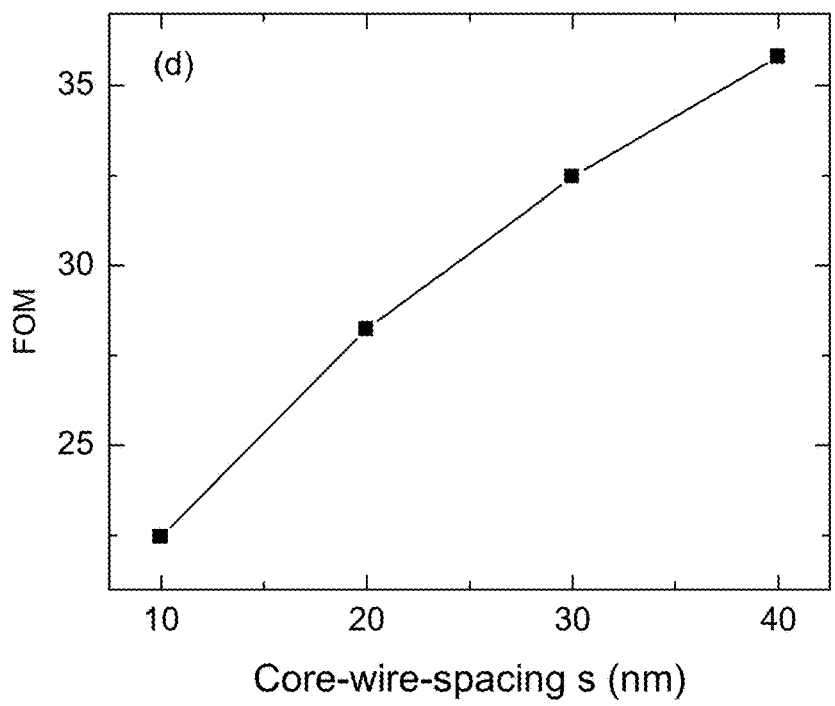

As the first step, the resonant wire length (L) is evaluated at a few wire widths and thicknesses. The graphs in FIGS. 9-12 show the modeling results. The array is periodic and has 6 wires. The FOM (figure-of-merit) is defined as the loss in $TE_{00}$ mode divided by the loss in the $TE_{10}$ mode. The graph in FIG. 9 shows total absorption, loss in the $TE_{10}$ mode and loss in the $TE_{00}$ mode after propagating through the Rh wires array versus wire length (L). For this modeling, wire thickness t=40 nm along Y direction, width W=60 nm along Z direction, period $\Lambda$=240 nm, and spacing from core s=20 nm. The graph in FIG. 10 shows FOM versus wire length at two wire widths (w=40 nm and 80 nm) and at wire thickness t=40 nm, period $\Lambda$=200 nm, and spacing s=30 nm. The graph in FIG. 11 shows FOM versus wire length at two wire thicknesses (t=30 nm and 50 nm) and at wire width w=60 nm, period $\Lambda$=200 nm, and spacing s=30 nm. The graph in FIG. 12 shows FOM versus core-wire spacing s at wire width w=60 nm, thickness t=40 nm, length L=120 nm and period=200 nm It is evident that the loss in the $TE_{00}$ mode, the absorption in the Rh wires, and FOM are maximized at the wire length L≈120 nm for the wire widths and thicknesses studied. The FOM is dependent on the dimension of the wire (width, thickness) and the core-wire separation. In particular, narrower wire (with greater aspect ratio, L/w) has greater FOM. It is interesting to see that a FOM of 50 can be readily obtained using this configuration.

Figure 13:
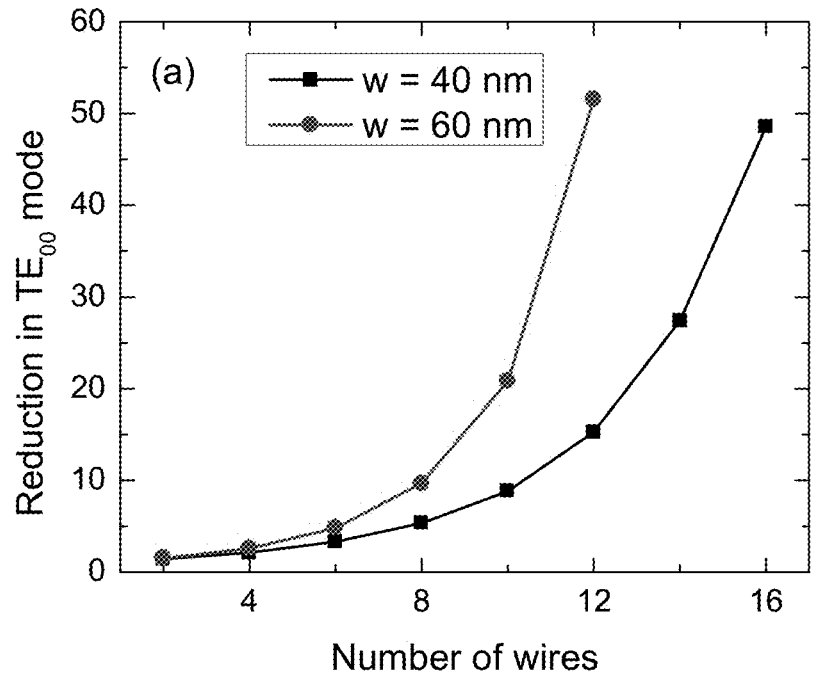
FIGS. 13, 14, 15, 16, and 17 are graphs showing effects on filter performance of a dipole array with different antenna numbers and antenna geometry according to example embodiments.
Figure 14:
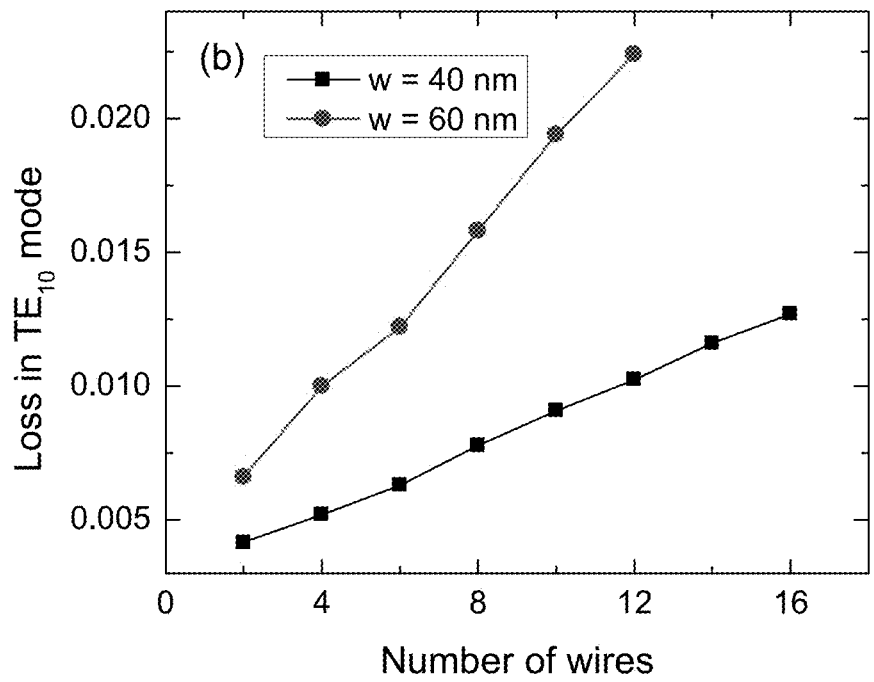
Figure 15:
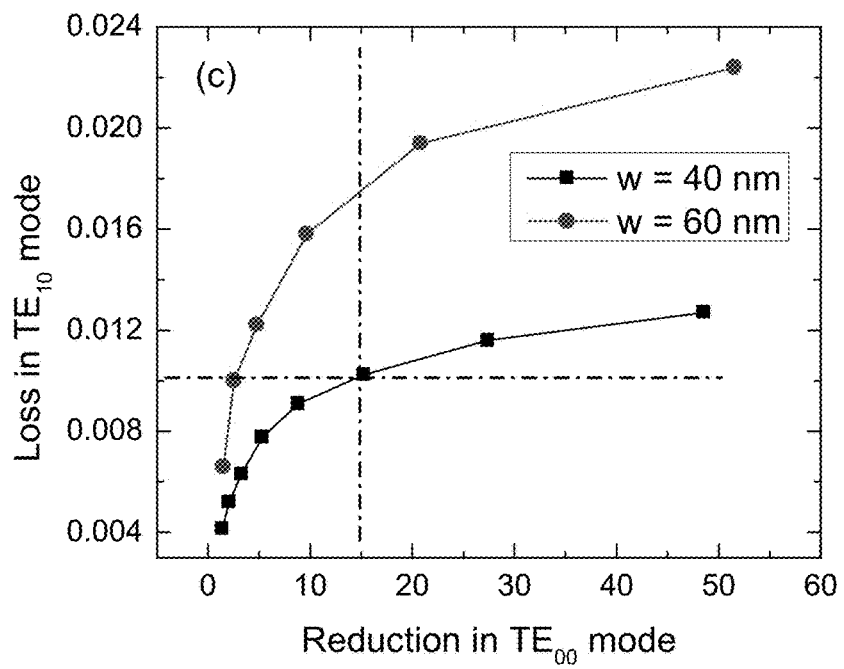

The graphs in FIGS. 13-15 show the performance versus the number of Rh wires at two wire widths, w=40 nm and 60 nm. The graph in FIG. 13 shows reduction in the $TE_{00}$ mode versus the number of wires. The graph in FIG. 14 shows loss in the $TE_{10}$ mode versus the number of wires. The graph in FIG. 15 shows loss in $TE_{10}$ mode versus the reduction in the $TE_{00}$ mode. As expected, the loss in the $TE_{10}$ mode nearly linearly increases with the number of wires while the reduction in the $TE_{00}$ mode increases rapidly. Here the reduction in the $TE_{00}$ mode is defined as the input power of the $TE_{00}$ mode, which is 0.5 in this modeling, divided by the output power in the $TE_{00}$ mode after propagating through the wire array. The $TE_{00}$ mode could be reduced by a factor of 50 with only 12-16 wires, leading a total length of around 2.4-3.2 μm. It is also seen that narrower wires have better performance. At wire width w=40 nm, a 15× reduction in the $TE_{00}$ mode only loses 2% in the $TE_{10}$ mode, and a 50× reduction in the $TE_{00}$ mode only loses 2.5% in the $TE_{10}$ mode.

The reflection in the presence of the wires is also evaluated. Even at a 50× reduction in the $TE_{00}$ mode (wire width w=60 nm, 12 Rh wires), the reflected $TE_{10}$ mode is only $4\times10^{-5}$. The reflected $TE_{00}$ mode is higher, about 2.5%. For the light path shown in FIGS. 2 and 3, it has mode sorting function. The reflected $TE_{00}$ mode will not return the light source cavity 106 but will be routed to the branch waveguide 302.

The array of plasmonic dipole antenna could be periodic or non-periodic. Each antenna could function independently if they are not spaced too closely. Each wire does not need to have identical dimension. This eases the fabrication. But a periodical array with the periodicity near the first Bragg condition does perform the best. The Bragg condition for the $TE_{00}$ mode can be approximately estimated as shown below in Equation (1), where $n_{eff}(TE_{00})$ denotes the effective mode index of the $TE_{00}$ mode.

$$[n_{eff}(TE_{00})|_{no\ wire} \times (1 - w/\Lambda) + n_{eff}(TE_{00})|_{with\ wire} \times (w/\Lambda)] \times \Lambda = \quad (1)$$
$$m\lambda_0/2, m = 1, 2, 3, \ldots$$

Figure 16:
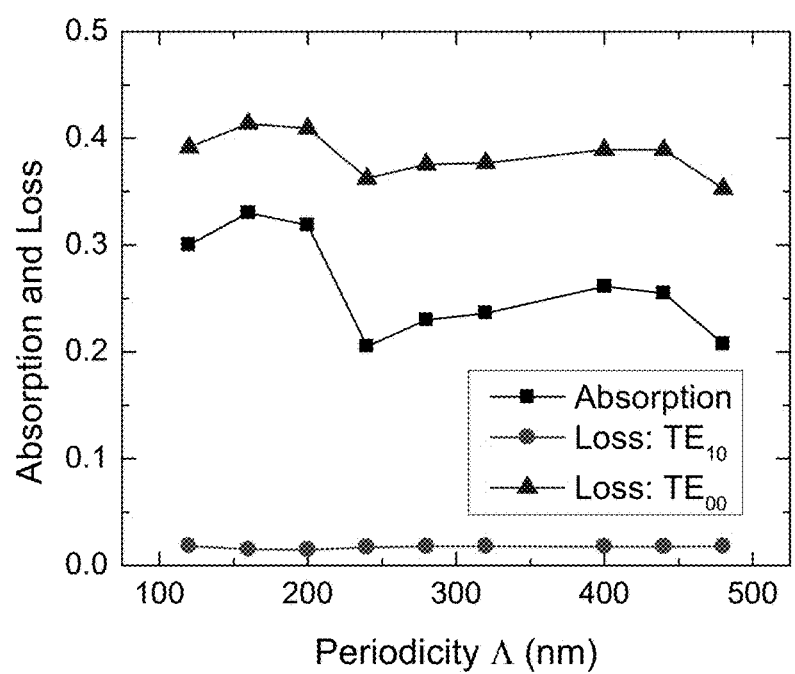
Figure 17:
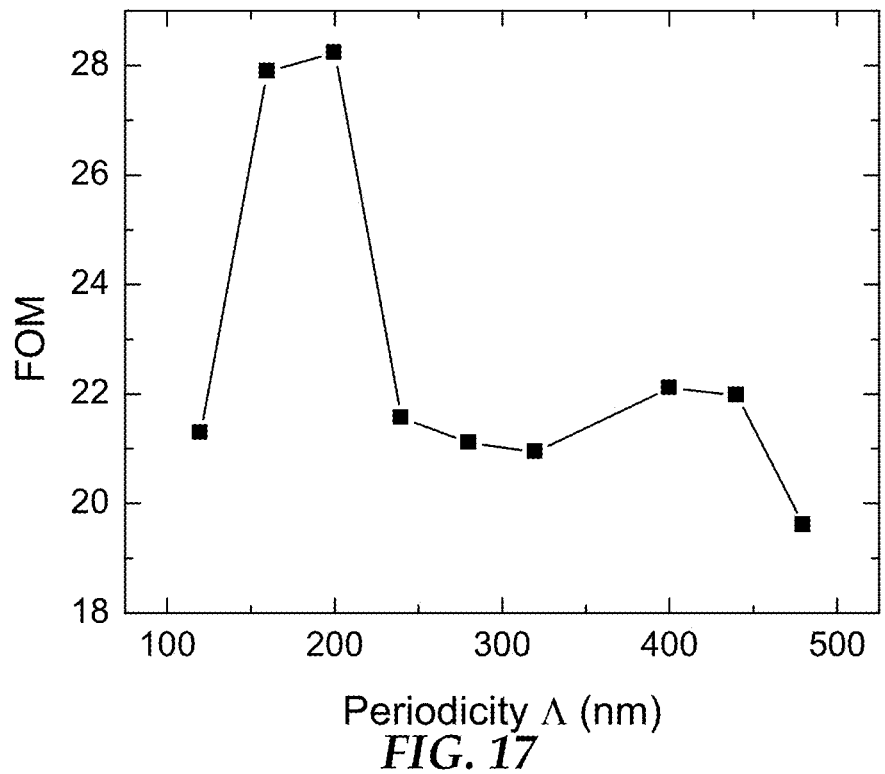

The graphs in FIGS. 16 and 17 show the performance of a periodic array of 6 wires as a function of periodicity $\Lambda$. In this modeling, each wire is w=60 nm wide, L=120 nm long, t=40 nm thick, and core-wire spacing s=20 nm. It is seen that the array performs better at the periodicity $\Lambda$≈200 nm (the first order) and 400 nm (the second order). Based on Equation (1), Λ is estimated to be 230 nm at the first order (m=1), which is slightly off from the actual modeling.

Figure 18:
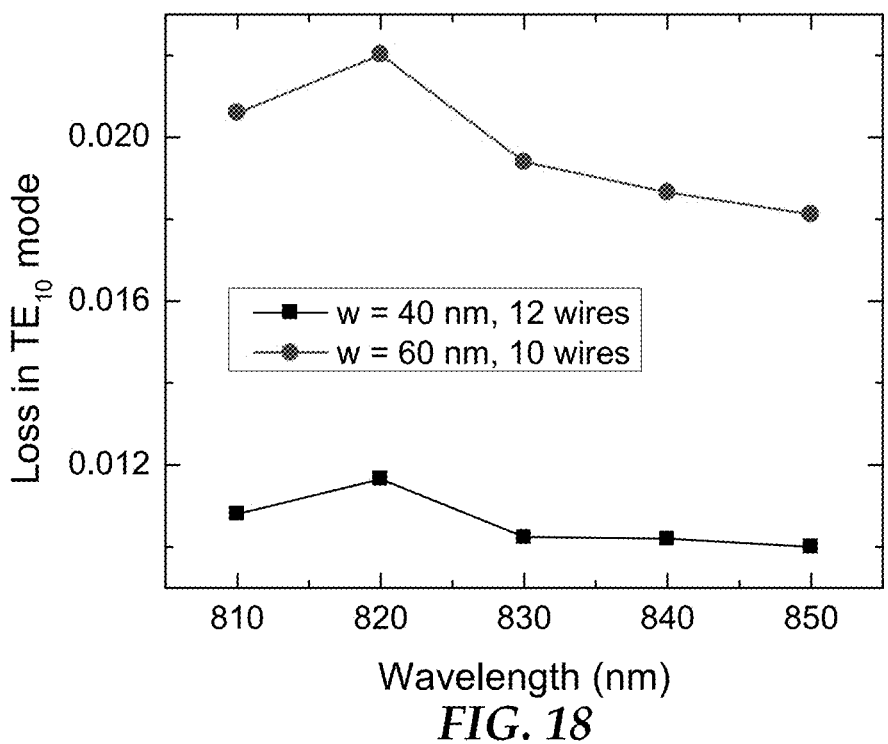
FIGS. 18, 19, and 20 are graphs showing effects on dipole array filter performance for variance in laser light wavelength according to example embodiments.
Figure 19:
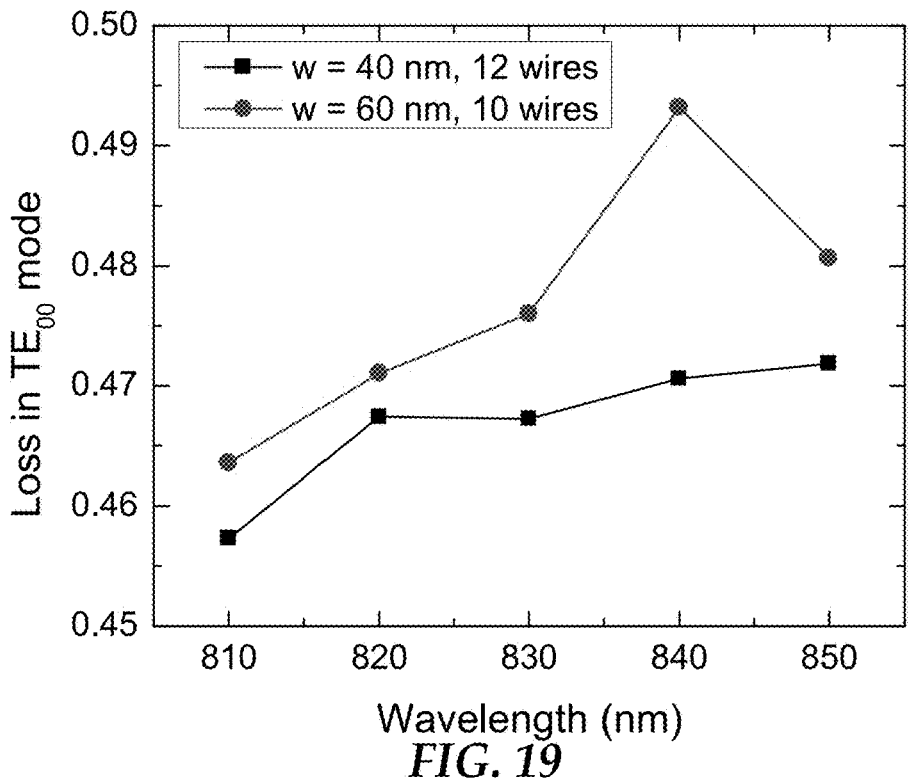
Figure 20:
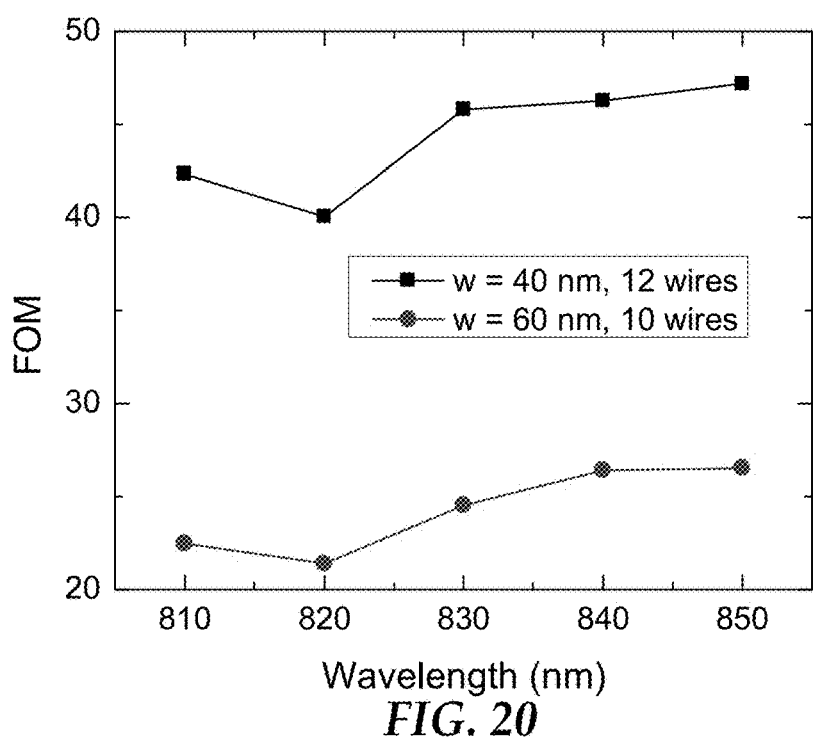

For HAMR applications, a Fabry-Perot edge-emitting laser diode is usually used as the light source. The emission light wavelength will vary with the ambient temperature, typically at a rate of ~0.25 nm/K, due to the gain shift and the bandgap of the active material with temperature. The graphs in FIGS. 18-20 show the modeling result versus light wavelength. Apparently there is no significant change in the performance in the desired wavelength ranges, corresponding an ambient temperature change of −80K to 80 K. Actually, with the increasing wavelength, the loss in the $TE_{10}$ mode decreases while the loss in the $TE_{00}$ mode increases. This means that the array performs slightly better at longer wavelength.

Figure 21:
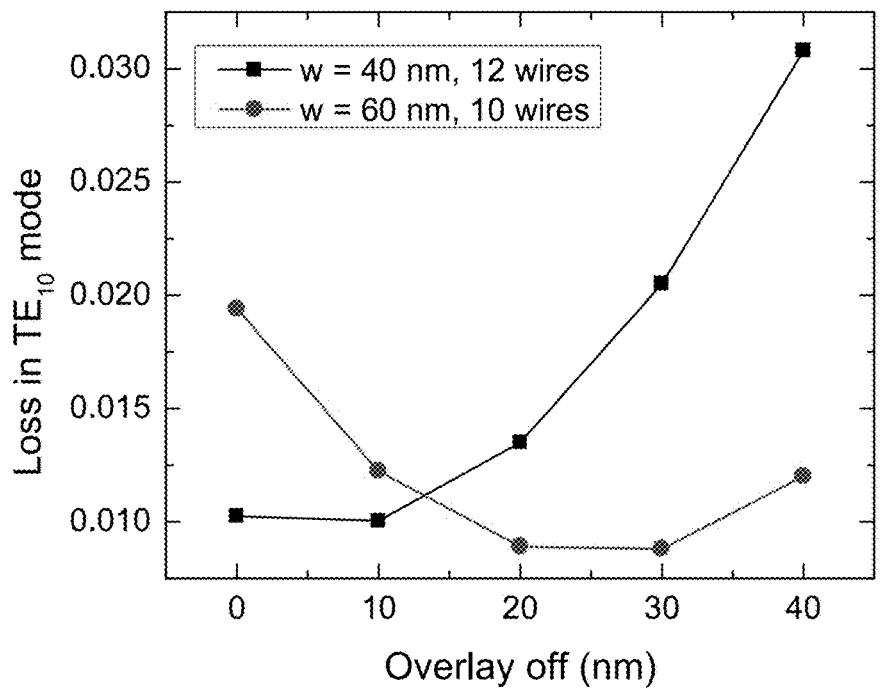
FIGS. 21, 22, and 23 are graphs showing effects of manufacturing tolerances on dipole array filter performance according to example embodiments.
Figure 22:
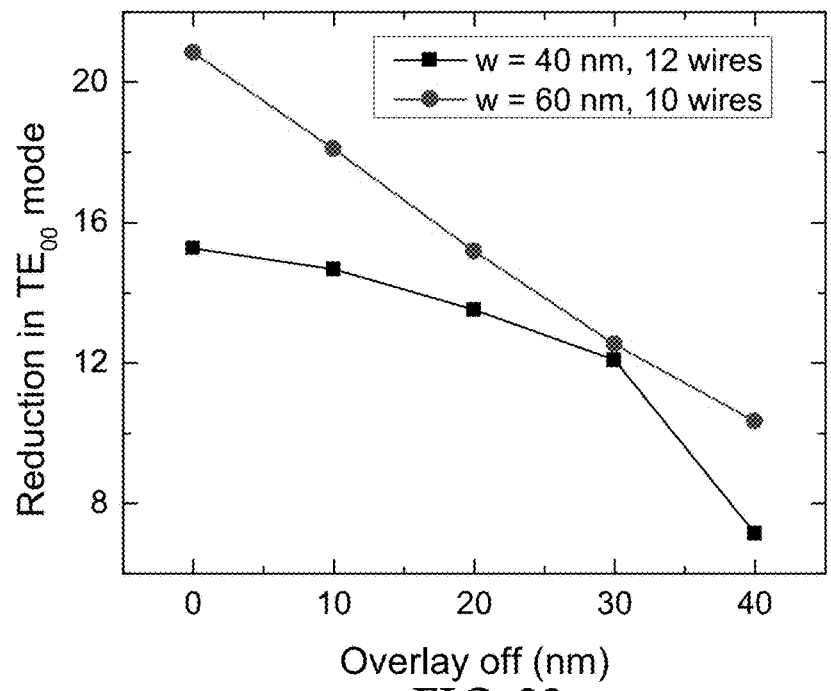
Figure 23:
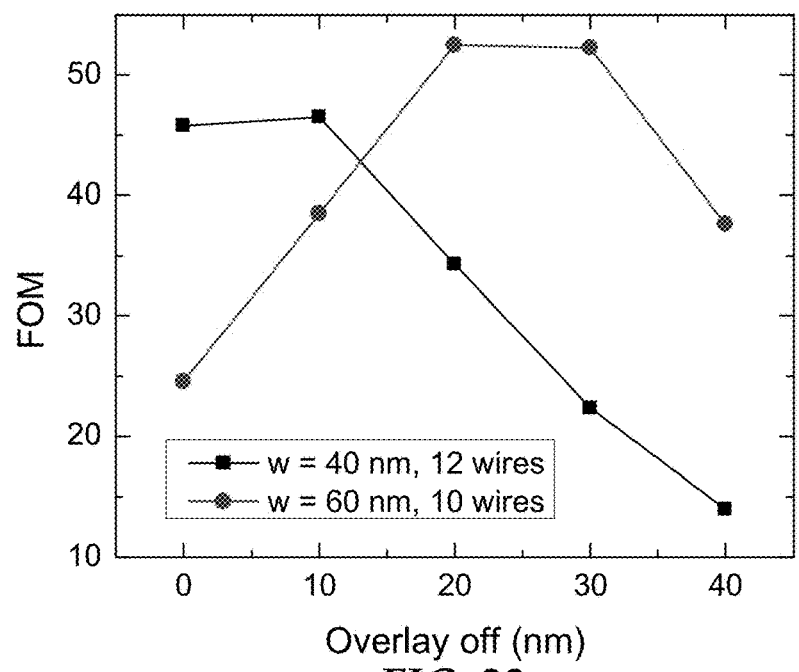

For top-down fabrication, the overlay tolerance between the waveguide core and the array along the X direction needs to be considered. When the array is off the core center along the X direction, the electric field of the $TE_{00}$ mode at the wires will decrease. The efficiency of scattering/absorbing the $TE_{00}$ mode for the same number of wires is expected to decrease. In the meantime, the wires will experience the field from the $TE_{10}$ mode due to the field asymmetry relative to the wires. The current process has an overlay error up to 20 nm. The graphs in FIGS. 21-23 show the modeling result to determine the effects of overlay error. As expected, the wire array of the narrow width, w=40 nm, has inferior performance at large overlay off, i.e., the loss in the $TE_{10}$ mode goes up, the reduction in the $TE_{00}$ mode goes down, and the FOM decreases. But interestingly, the best performance for the wide width, w=60 nm, is actually off the center of waveguide core. For the overlay error up to 20 nm, the degradation in performance is still low.

Figure 24:
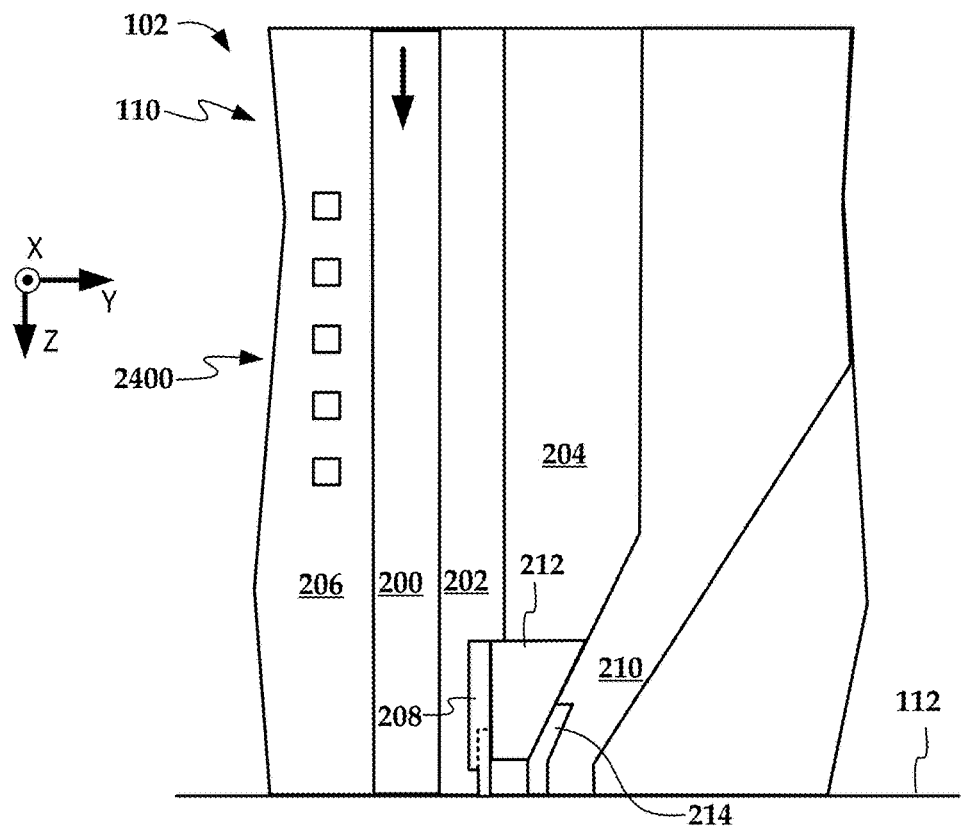
FIGS. 24, 25, and 26 are cross-sectional diagrams of a dipole array according to other embodiments.
Figure 25:
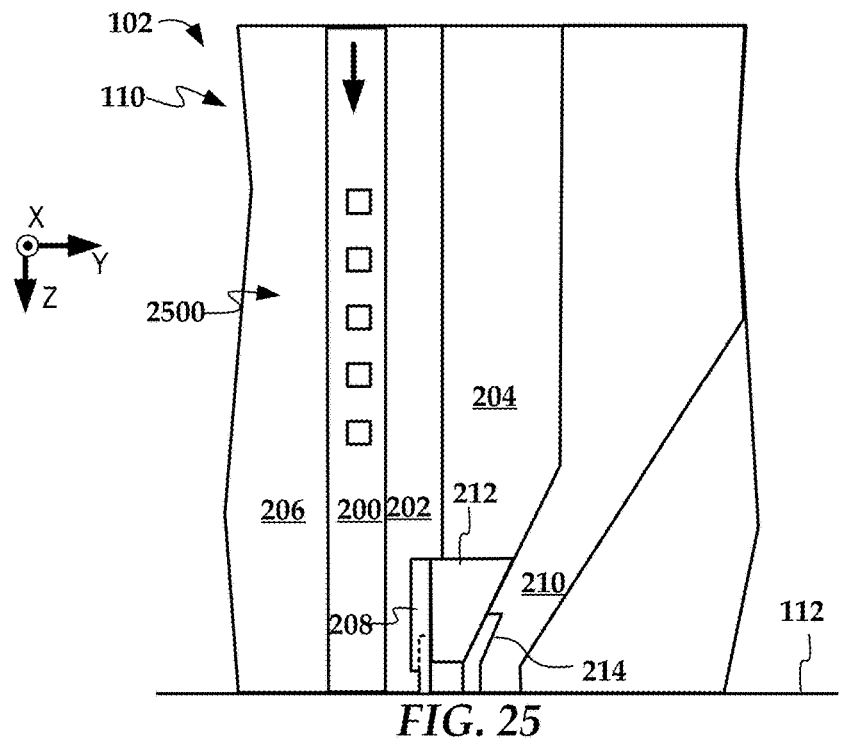
Figure 26:
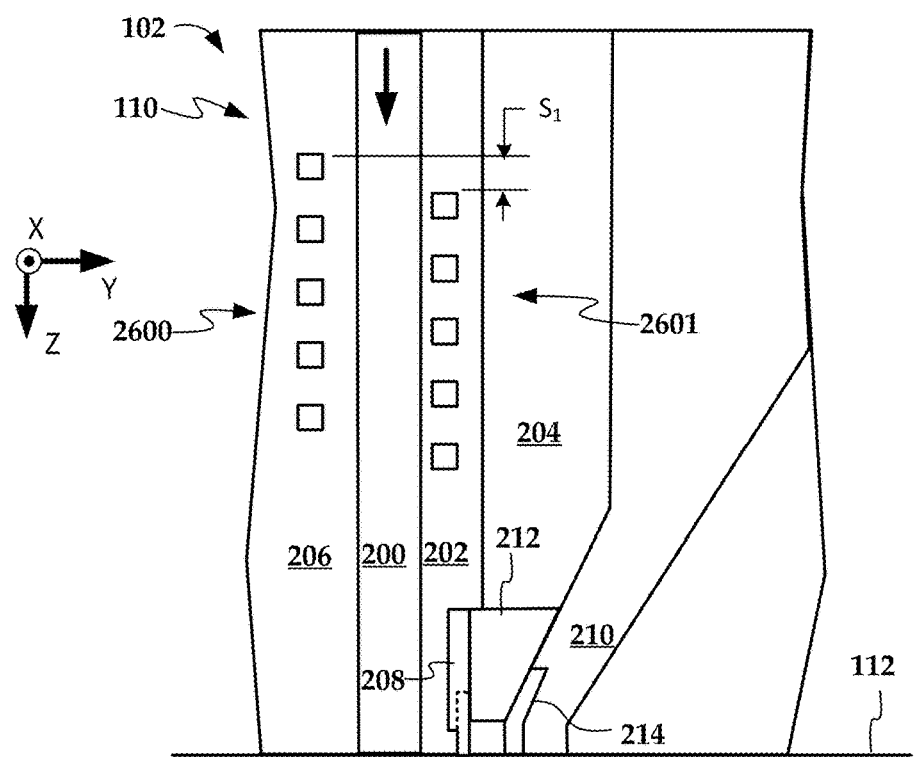

The cross-sectional diagram in FIGS. 24-26 shows alternative configurations for integrating an antenna array(s) in the waveguide for a $TE_{00}$ mode cleanup. For purposes of convenience, reference numerals from FIG. 2 are used to designate analogous components in FIGS. 24-26. In FIG. 24, an array 2400 is located in the bottom cladding layer 206. In FIG. 25, an array 2500 is located in the core layer 200. In FIG. 26, two arrays 2600, 2601 are shown integrated in one waveguide 108, one at the side cladding 202 (or alternatively top cladding 204) and other at the bottom cladding 206. This can allow shortening of the total length of the arrays 2600, 2601. The longitudinal shift, $S_1$, between the two gratings could be used to nullify the $TE_{00}$ reflection from either array if the relative phase resulted from the shift between the two arrays is an odd multiples of π phase.

Figure 27:
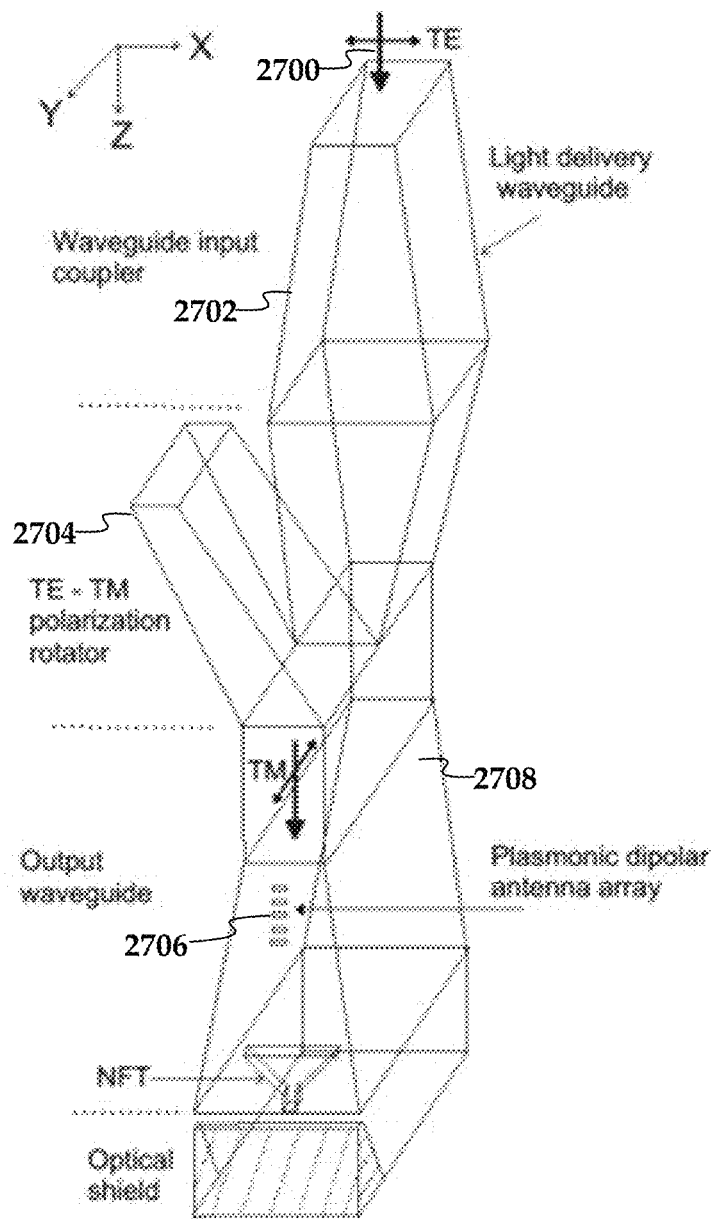
FIG. 27 is a perspective view of a transverse-magnetic-mode waveguide system utilizing a filter according to an example embodiment.

An array of plasmonic dipole antenna can also be used to filter out a $TE_{00}$ mode from an output waveguide with $TE_{00}$-TM (transverse magnetic) mode mixing for applications with TE-to-TM polarization rotator involved. The perspective view of FIG. 27 shows a fundamental transverse magnetic mode, $TM_{00}$, light delivery configuration integrated with a TE-to-TM polarization rotator. A TE polarized light 2700 emanating from a light source, such as an edge-emitting laser diode (not shown in the figure) is coupled into a waveguide on a magnetic slider by a first portion of the waveguide configured as a waveguide input coupler 2702. The coupling excites a fundamental TE mode in the waveguide, polarized along X direction. This TE mode is intended to be converted into a TM mode, polarized along Y direction, by a polarization rotator 2704. An array 2706 of plasmonic dipolar antenna is placed in a second waveguide portion (e.g., output waveguide 2708) to clean up the residing $TE_{00}$ mode after the TE-to-TM polarization rotator. The antenna exhibits dipolar longitudinal surface plasmon resonance, excited by the $TE_{00}$ mode, polarized along the elongated direction of the antenna, which efficiently scatters and absorbs the $TE_{00}$ mode. On the other hand, this antenna does not interact with a TM mode, polarized along the Y direction, since the transverse resonance is weak and is at a different resonant wavelength. This provides polarization selection.

Figure 28:
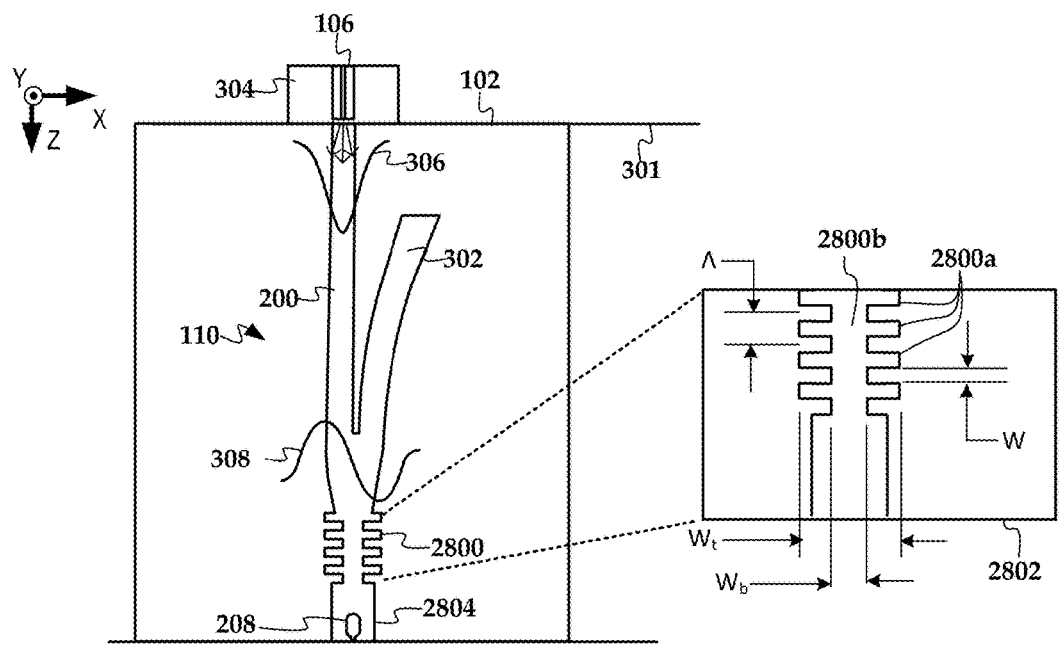
FIGS. 28 and 29 are wafer plane views of a slider using a periodic grating as a filter according to another example embodiment.
Figure 29:
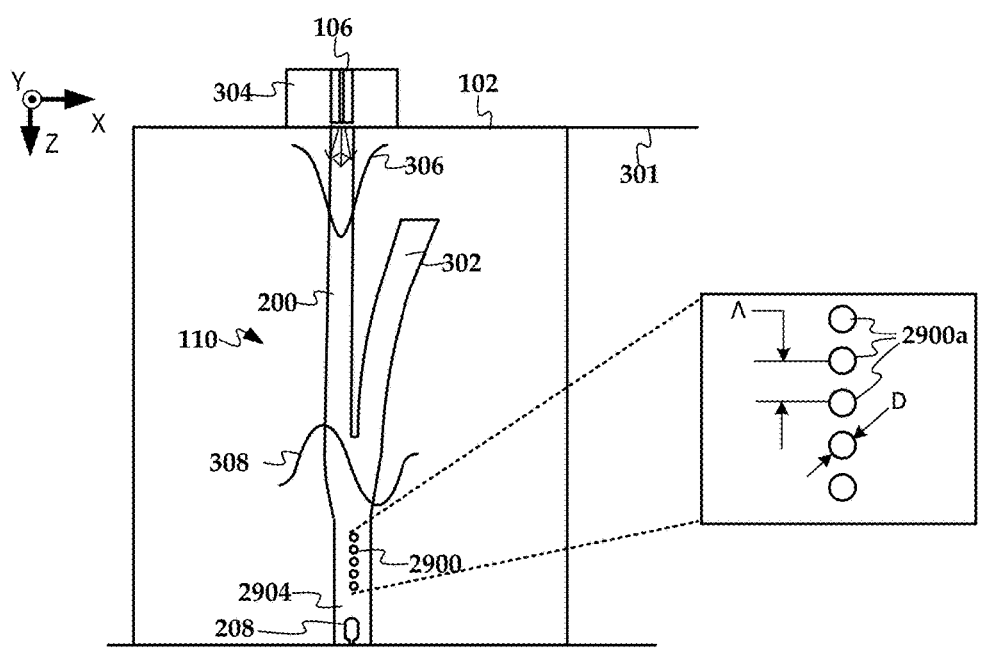
Figure 30:
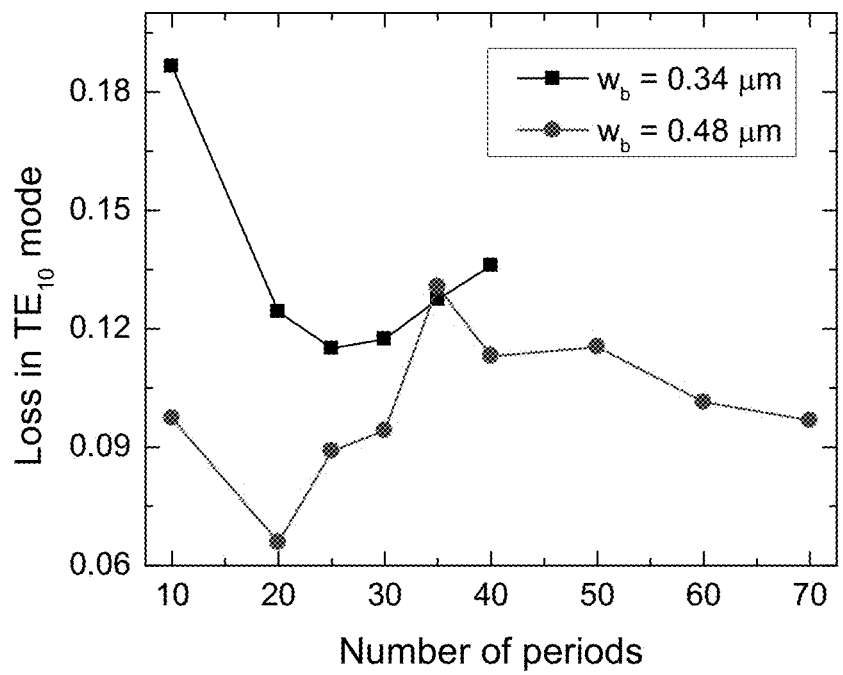
FIGS. 30, 31, 32, 33, 34, and 35 are graphs showing of a periodic grating filter according example embodiments.
Figure 31:
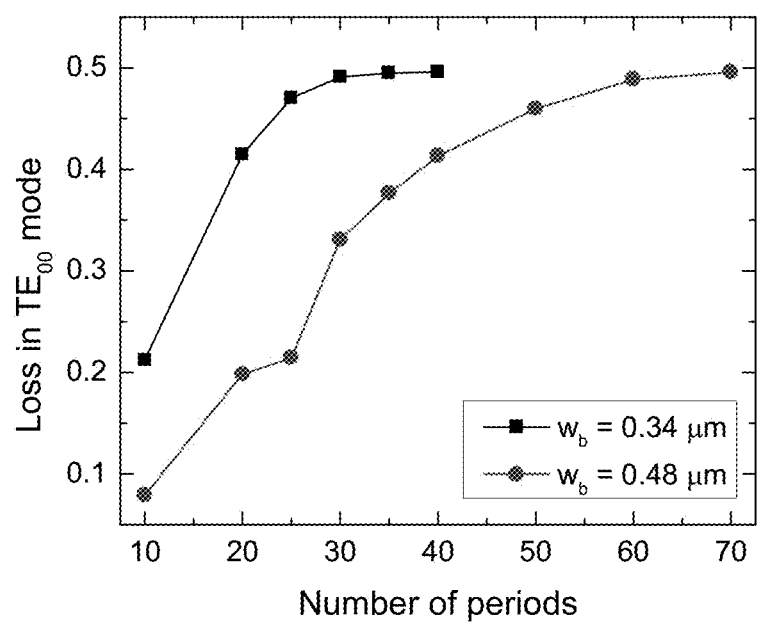
Figure 32:
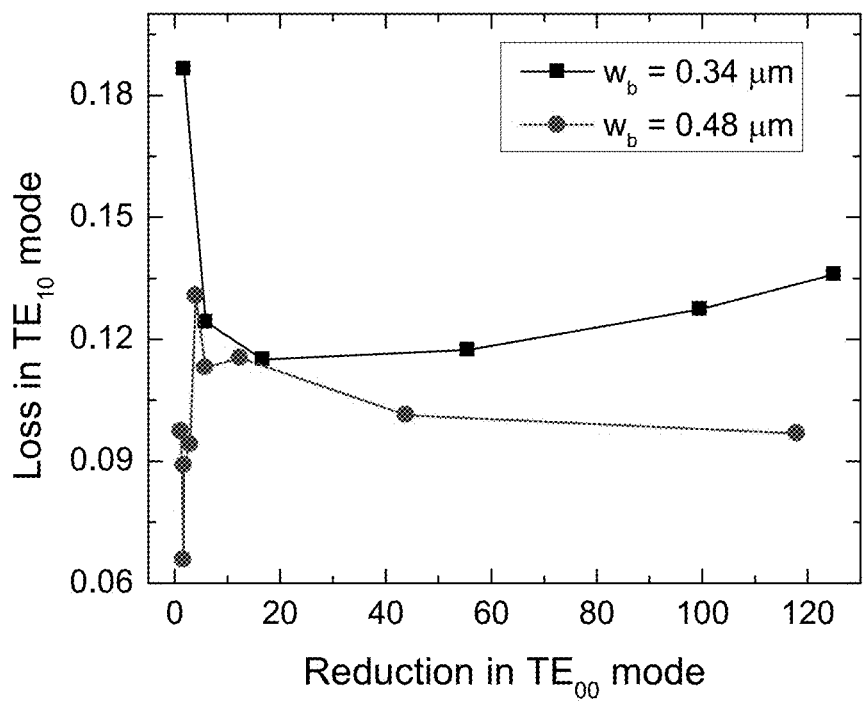
Figure 33:
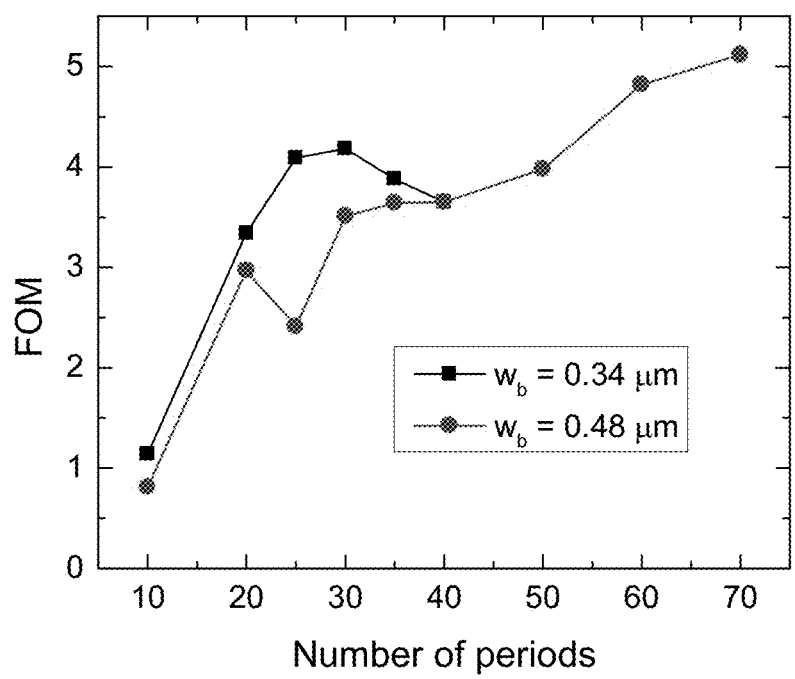

In other embodiments, a dielectric photonic crystal could be used to filter out a fundamental mode. The cross-sectional diagrams on FIGS. 28 and 29 show two configurations to eliminate the $TE_{00}$ mode while pass the $TE_{10}$ mode, employing a periodic grating. For purposes of convenience, reference numerals from FIG. 3 are used to designate analogous components in FIGS. 28 and 29.

In one embodiment, a periodic distributed Bragg grating (one type of photonic crystals) could be designed to reflect one specific mode, for instance, a $TE_{00}$ mode, if the modes supported by the waveguide are not degenerate in the effective mode index and/or in polarization. This solution is usually effective for a waveguide of high contrast in the refractive index between core and cladding, for instance, silicon (Si) as a core and silica ($SiO_2$) and/or air as claddings. In such circumstances, the periodic Bragg grating functions as a photonic crystal, which places the mode to be filtered in the bandgap. The insertion loss for the pass modes will be minimal. For current HAMR application, at light wavelength is $\lambda_0$~830 nm, the materials available for waveguide are quite limited, for instances, AlN, $Ta_2O_5$, $Nb_2O_5$ (niobium oxide), and $Ba_4Ti_3O_{12}$ (barium titanate) for core, and $Al_2O_3$, $SiO_2$ for cladding. The index contrast between core and cladding is low, so the insertion loss is quite high.

In FIG. 28, a periodic Bragg grating 2800 is etched through the core on either side of the core near an output waveguide 2804. The close up view 2802 shows various dimensions, as well as teeth 2800a and bridge 2800b of the grating 2800. There is no phase-shift (along the Z direction) between the two gratings. The grating period λ can be estimated based on the above Equation (1), which is rewritten as show in Equation (2) below, where $n_{eff}(TE_{00})$ at the teeth 2800a denotes the effective mode index of the $TE_{00}$ mode when the core is $W_t$ wide at the teeth, and at the bridge 2800b when the core is $W_b$ wide.

$$[n_{eff}(TE_{00})|_{teeth} \times (1 - w/\Lambda) + n_{eff}(TE_{00})|_{bridge} \times (w/\Lambda)] \times \Lambda = m\lambda_0/2, \quad (2)$$

$$m = 1, 2, 3, \ldots$$

The bridge width is chosen to be narrow such that the waveguide at the core width=$W_b$ is monomode, which does not support a higher order mode. The $TE_{00}$ mode is reflected and/or scattered by the grating 2800 and therefore, is eliminated. Since the $TE_{10}$ mode has lower effective mode index than the $TE_{00}$ mode, due to its weaker confinement, the Bragg grating condition for the $TE_{10}$ mode is not satisfied. The higher-order $TE_{10}$ mode will be converted to a Bloch mode in the grating and propagating through the grating 2800 with low insertion loss. The teeth width $W_t$ is chosen to minimize the loss in the $TE_{10}$ mode by matching the mode profile between the input waveguide and the Bloch mode.

The graphs in FIGS. 30-33 show the modeling results for the waveguide shown in FIG. 28. The cut-off core width for the $TE_{10}$ mode is 0.5 μm. Two cases are studied: (1) bridge width $W_b$=0.48 μm, teeth width $W_t$=1.0 μm, grating period Λ=236.04 nm, (2) bridge width $W_b$=0.34 μm, teeth width $W_t$=1.14 μm, grating period Λ=240 nm. This demonstrates that a Bragg grating can effectively filter out the $TE_{00}$ mode. A narrower bridge is more efficient to filter out the $TE_{00}$ mode.

Figure 34:
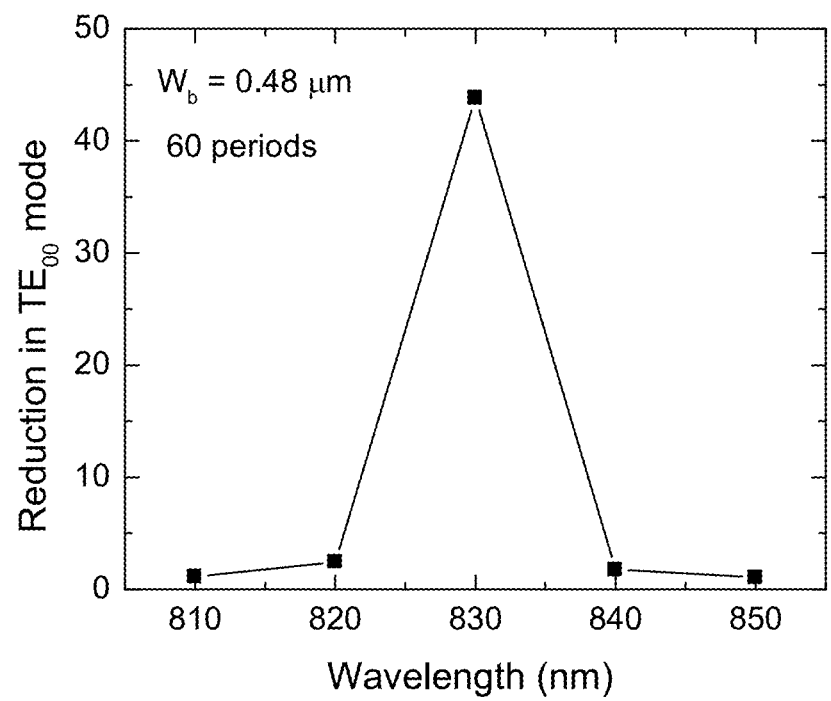
Figure 35:
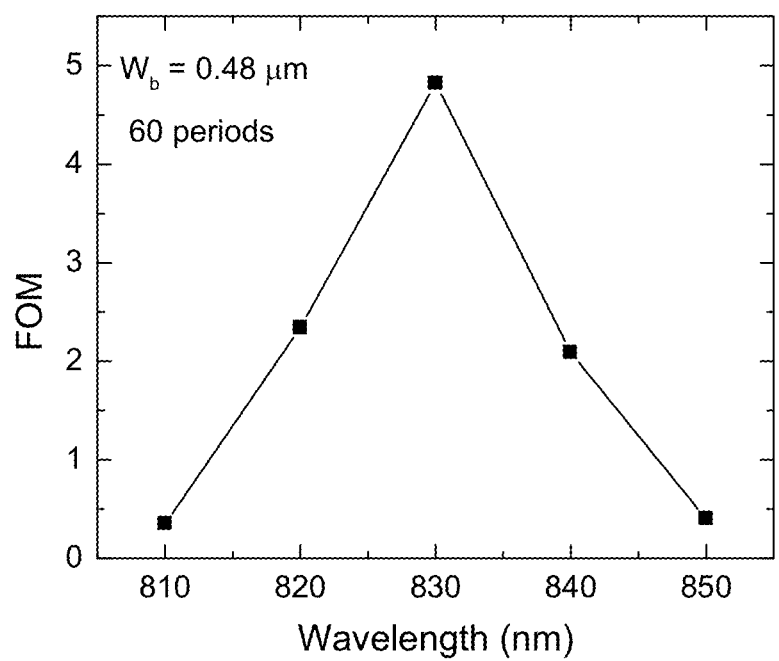

Compared to the solutions using a dipole array, there may be at least two drawbacks with a dielectric Bragg grating. Firstly, a Bragg grating causes high insertion loss. About 20% $TE_{10}$ mode is lost to reduce the $TE_{00}$ mode by a factor of 10 or more and the FOM is only 4-5, which is nearly one order inferior to that of a plasmonic dipolar array. Secondly, which is particular to HAMR application, a long periodic Bragg grating has high sensitivity to the light waveguide. The graphs in FIGS. 34-35 show the performance versus wavelength for the case with the bridge width $W_b$=0.48 μm. If the wavelength is off 10 nm, the filter will no longer function properly. The sensitivity could be improved if the waveguide has a high index contrast, for instance, Si as a core, $SiO_2$ or air as a cladding.

In the cross-sectional view of FIG. 29, a periodic array 2900 of cylinders 2900a is etched through the middle of core prior near output waveguide 2904. The material for the cylinder 2900a has an index of refraction differing from that of the core. The $TE_{00}$ mode, whose electric field is peaked at the center of the core, is scattered and reflected by the inclusion. The $TE_{10}$ mode, on other hand, is less affected by the inclusion, due to its null field at the center of the core (see FIGS. 7 and 8).

As a $TE_{00}$ cleanup filter, the configuration in FIG. 29 has similar performance to the configuration shown in FIG. 28. For instance, a 30-period array of $Al_2O_3$ cylinders in the $Nb_2O_5$ core with cylinder diameter D=200 nm at Bragg grating period λ=480 nm reduces the $TE_{00}$ mode by a factor of 10 but with 22% loss in the $TE_{10}$ mode.

Figure 36:
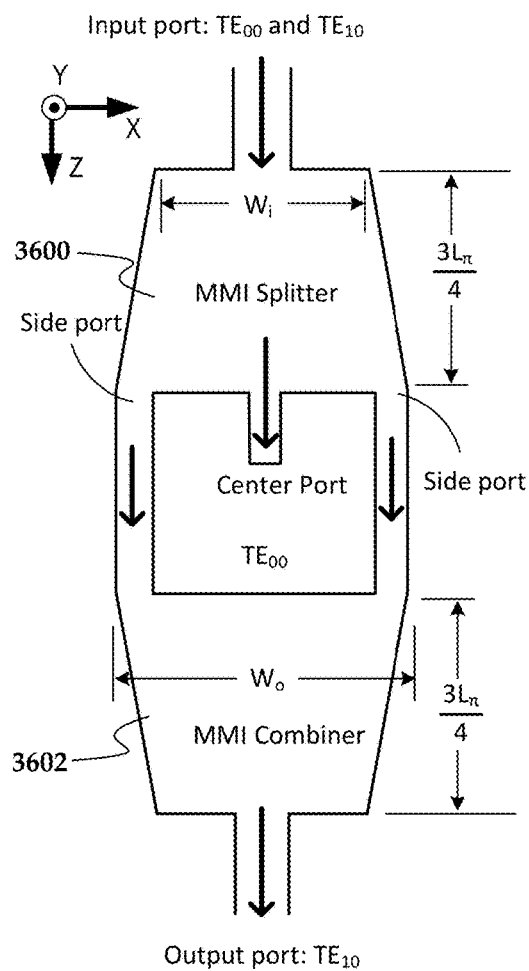
FIGS. 36 and 37 are wafer plane views of a slider using a multimode interference splitter and combiner as a filter according to another example embodiment.
Figure 37:
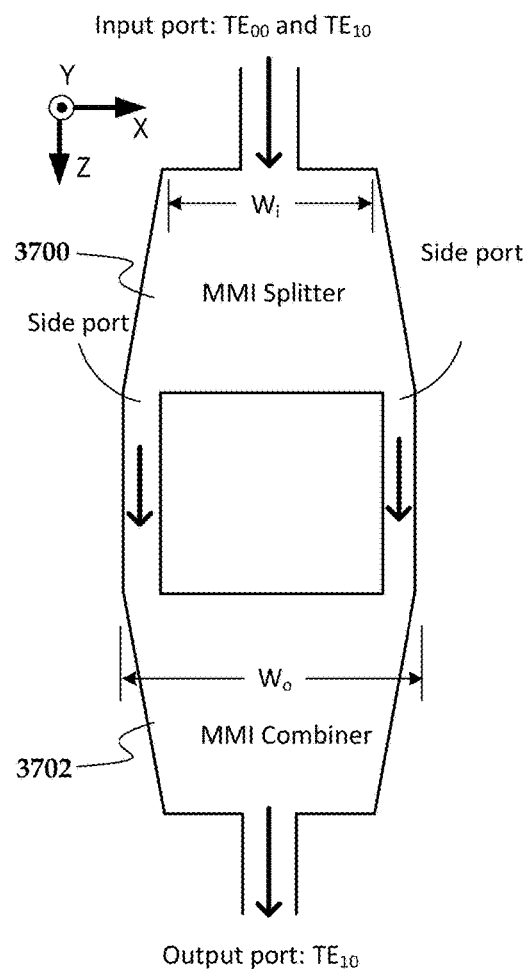

In other embodiments, multimode interference (MMI) splitters and combiners may be used to filter the fundamental modes. An MMI splitter is based on self-imaging to reproduce an input field profile in single or multiple images at periodic intervals along the propagation direction of the guide in multimode waveguides. The diagrams of FIGS. 36 and 37 show symmetric MMI splitters 3600, 3700 in combination with respective MMI combiners 3602, 3702 to filter out the fundamental mode ($TE_{00}$, $TM_{00}$) from the input and output the higher-order mode ($TE_{10}$, $TM_{10}$).

The MMI splitter separates the input fundamental mode, for instance, $TE_{00}$, from the first higher-order mode, for instance, $TE_{10}$. The input $TE_{00}$ mode is imaged into the center port with 100% efficiency and the input $TE_{10}$ mode into the two side ports at an appropriate MMI splitter length L:

$$L = \frac{3L_\pi}{4}.$$

If the MMI coupler has constant width, $W_i$=$W_o$, $L_\pi$ denotes the beat length of the two lowest-order modes, and is found as shown in Equation (3) below, where $\beta_0$ ($n_{eff}(TE_{00})$ and $\beta_1$ ($n_{eff}(TE_{10})$) denote the propagation constant (effective mode index) for the fundamental $TE_{00}$ mode and the first higher-order $TE_{10}$ mode, respectively, $\lambda_0$ is light wavelength in free space, and Weq is the effective width of the MMI coupler, which takes account of the penetration depth of mode field into the cladding associated with the Goos-Hanchen shift.

$$L_\pi = \frac{\pi}{\beta_0 - \beta_1} = \frac{\lambda_0}{2[n_{eff}(TE_{00}) - n_{eff}(TE_{10})]} \approx \frac{4n_{eff}W_{eq}^2}{3\lambda_0} \quad (3)$$

The approximation above is valid for waveguides of low-index contrast between core and cladding. For a tapered MMI splitter shown in FIG. 36, $L_\pi$ is replaced by $\alpha L_\pi$. Here α is a factor depending on the structure of the interference region. For a linear tapered MMI device, $$\alpha = \frac{\min(W_i, W_o)}{\max(W_i, W_o)}.$$

The two side ports are connected with the MMI combiner, which is the mirror image of the MMI splitter, while the center port from the MMI splitter is blocked or absorbed. The MMI combiner reproduces the input $TE_{10}$ mode.

In practice, the MMI cleanup filter has at least two drawbacks. Firstly, the filter will generate additional $TE_{00}$ mode if the two MMIs are off in dimension. Secondly, the filter is not compact. For instance, for the waveguide shown in FIG. 6, at core width=4 μm, the waveguide supports 10 TE modes. The mode index for the $TE_{00}$ mode $n_{eff}(TE_{00})$=1.82575 and that for $TE_{10}$ mode $n_{eff}(TE_{10})$=1.81750. If the MMI splitter/combiner has constant width, $W_i$=$W_o$, 3 $L_\pi$=150.9 μm, the splitter/combiner length L=37.727 μm. The total length of the filter will be longer than 80 μm, which may be difficult to fit into the current magnetic slider format. To shrink the size of the filter, a tapered MMI splitter/combiner may be used to compromise some resolution in the imaging (and therefore, the insertion loss). Modeling shows that it is preferred to have the input width $W_i$≥3 μm. Then length of each MMI can be reduced to $$37.727 \times \frac{3}{4} = 28.29 \text{ μm},$$

which may still be too long for the filter to be fitted into a magnetic slider. Secondly the MMI cleanup filter is not effective to separate a fundamental $TE_{00}$ mode from a fundamental TM mode.

Figure 38:
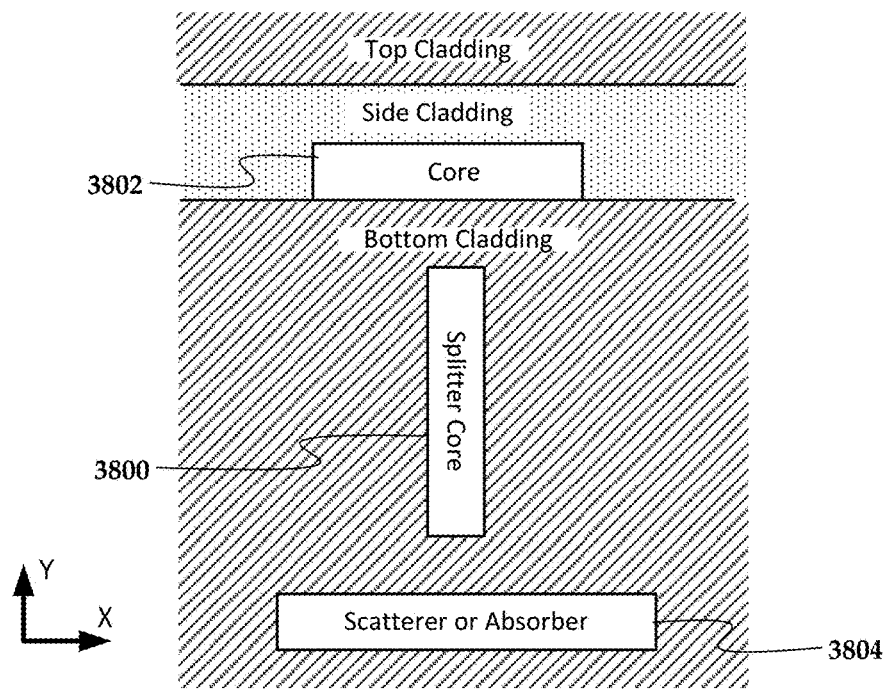
FIGS. 38 and 39 are cross-sectional views showing a directional coupler used as a filter according to another example embodiment.
Figure 39:
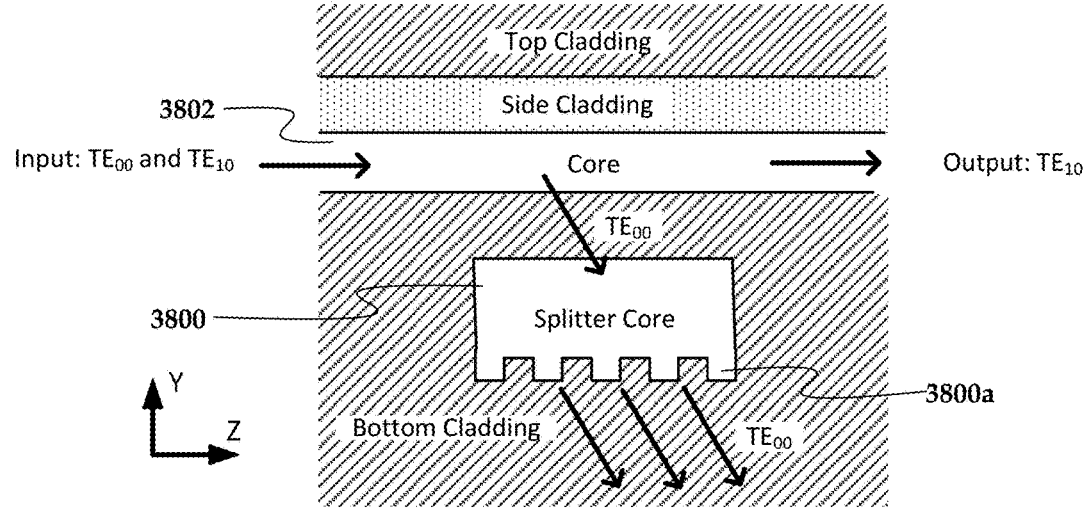

In other embodiments, a directional coupler may be used to filter the fundamental mode. The diagrams in FIGS. 38 and 39 are cross-sectional views of a dielectric coupler as a $TE_{00}$ cleanup filter. A splitter core 3800 is placed over or below the core to couple the $TE_{00}$ mode from the waveguide core 3802. The splitter 3800 is leaky, for instance, by a diffraction grating 3800a as shown in FIG. 39. In addition or in the alternate, a light absorbing material such as scatterer/absorber 3804 may be used, such that the light coupled into the splitter core will be scattered and/or absorbed. The splitter core 3800 does not support the higher-order mode. If the splitter core is exactly above or below the middle of the core 3802, e.g., there is no overlay off along the X direction between the core 3802 and the splitter 3800, the $TE_{10}$ mode will not be coupled into the splitter core 3800. The $TE_{10}$ mode will propagate through the filter with minimal loss while the $TE_{00}$ mode is filtered out.

Same as the dielectric Bragg grating, a high index contrast waveguide is preferred to have the filter as shown in FIGS. 38 and 39 function properly. Another drawback is the difficulty to form a splitter core 3800, which is thick (along the Y direction) while narrow (along the X direction). Note that the slider is generally built on an xz-parallel wafer plane, with layers being deposited in the Y direction. By way of comparison, the waveguide shown in FIG. 6 is 860 nm wide along X direction and 120 nm thick along Y direction. The splitter 3800 as shown will be close to 120 nm wide along X direction and 860 nm thick along Y direction, with an aspect ratio of as much as 860/120=7.

Figure 40:
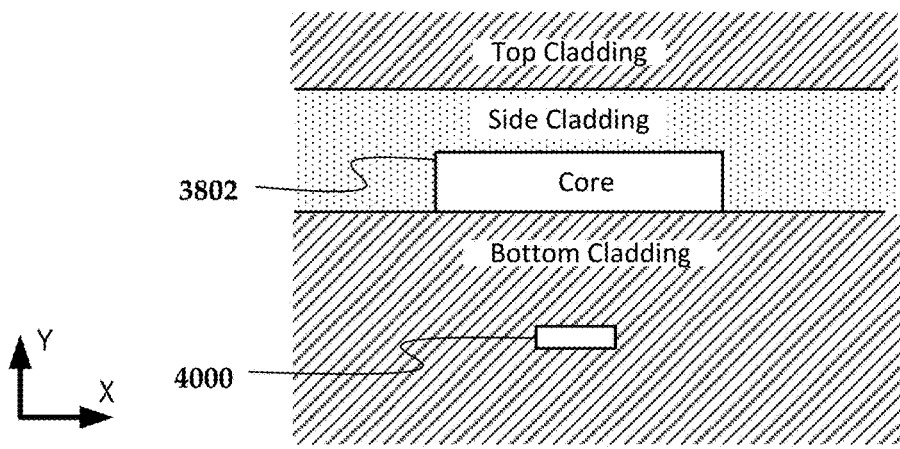
FIGS. 40 and 41 are cross-sectional views showing an absorber used as a filter according to another example embodiment.
Figure 41:
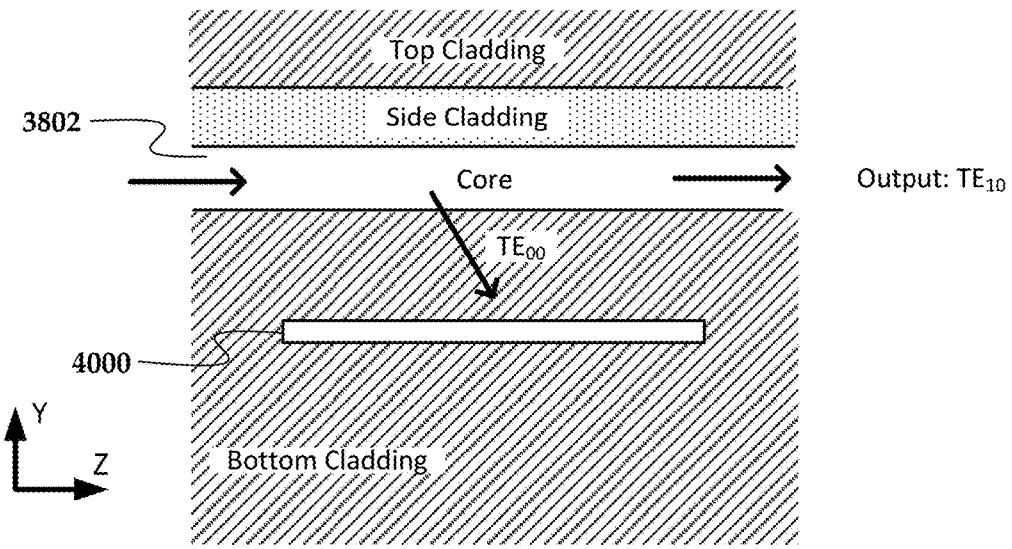

In other embodiments, an absorber may be used to filter the fundamental TE mode. Light confinement in a dielectric waveguide is based on the total internal reflection at the core/cladding interface. If a thin, narrow, and long lossy metallic or semiconductor wire, for instance, W (tungsten), InSb, is placed above or below the core and in the top and/or bottom cladding layer, high absorption will occur, due to the frustrated total internal reflections. The diagrams of FIGS. 40 and 41 show this configuration. Note that this absorption is not mode-order selective, which differs from all above solutions. If the wire 4000 is narrow, the wires will experience much more field from a fundamental mode than from a first-higher order mode, since the field of a fundamental mode is concentrated at the center of the core while it is zero for the first-higher order mode. Modeling showed that the FOM is only around 3-4 with a W wire of only 7 nm thick and 140 nm wide, which is less effective than the solution with a periodic dielectric Bragg grating and a directional coupler.

Figure 42:
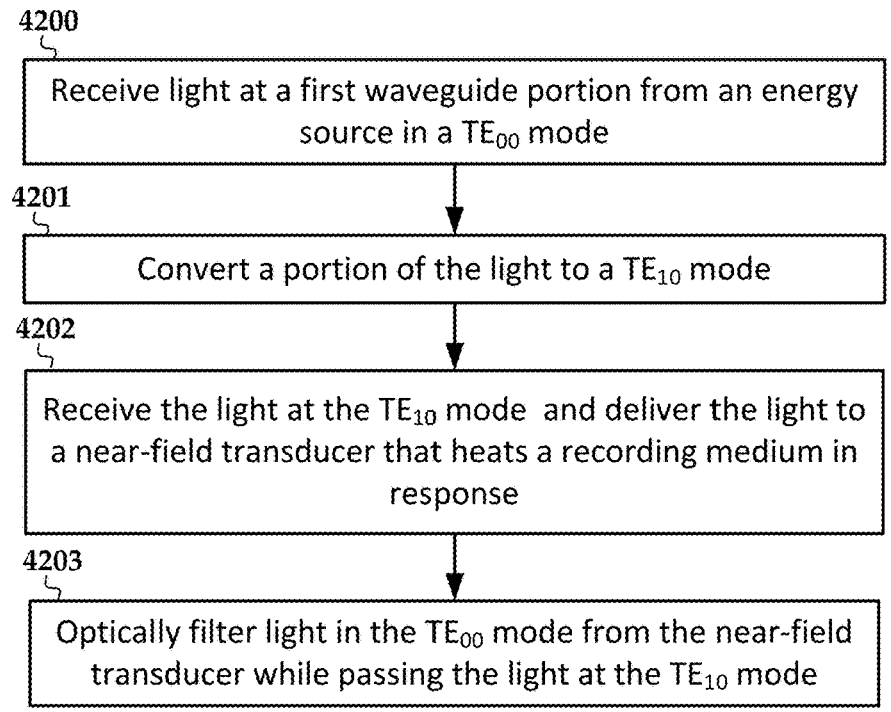
FIGS. 42 and 43 are flowcharts of methods according to example embodiments.

In FIG. 42, a flowchart shows a method according to an example embodiment. The method involves receiving 4200 light at a first waveguide portion from an energy source in a fundamental transverse electric ($TE_{00}$) mode. A portion of the light is converted 4201 to higher-order transverse electric ($TE_{10}$) mode. The light is received 4202 at the $TE_{10}$ mode at a second waveguide portion and delivered to a near-field transducer that heats a recording medium in response thereto. Light in the $TE_{00}$ mode is optically filtered 4203 from the near-field transducer while passing the light at the $TE_{10}$ mode.

Figure 43:
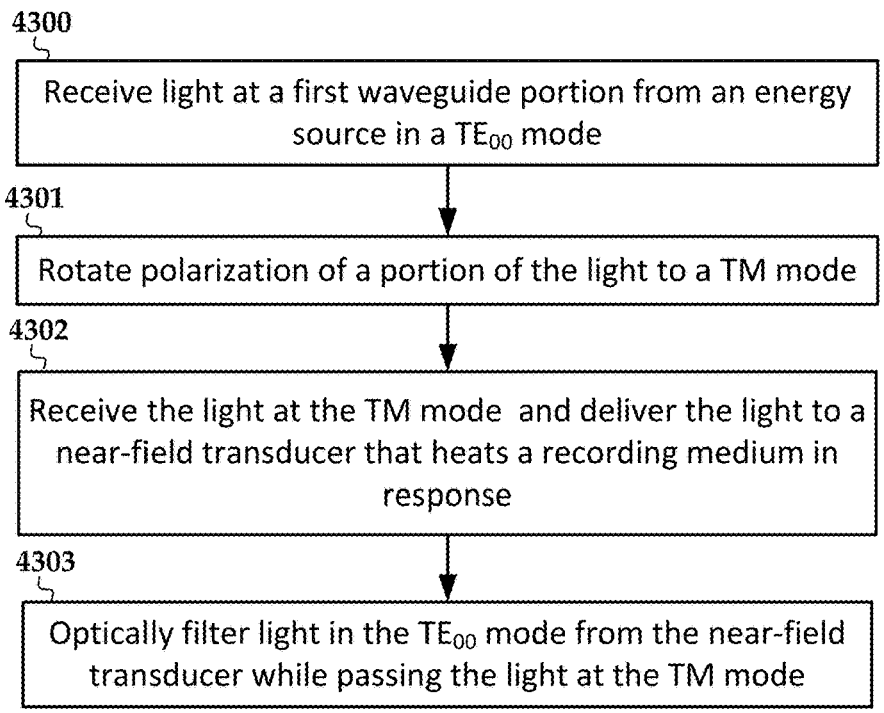

In FIG. 43, a flowchart shows a method according to another example embodiment. The method involves receiving 4300 light at a first waveguide portion from an energy source in a fundamental transverse electric ($TE_{00}$) mode. A polarization of a portion of the light is rotated 4301 to transverse magnetic (TM) mode. The light is received 4302 at the TM mode at a second waveguide portion and delivered to a near-field transducer that heats a recording medium in response thereto. Light in the $TE_{00}$ mode is optically filtered 4303 from the near-field transducer while passing the light at the TM mode.

In summary, methods of filter out the transverse electric fundamental mode ($TE_{00}$) from a light delivery with a spatial mode converter such that a $TE_{00}$-to-$TE_{10}$ mode, or a polarization rotator such as a $TE_{00}$-to-$TM_{00}$ mode, are described, which improves heads recording performance and wafer yield for heat-assisted magnetic recording. These methods include an array of plasmonic dipole antenna, a dielectric photonic crystal and particularly a periodic Bragg grating, a MMI (multi-mode interference) splitter and combiner, a directional coupler, and an absorbing wire. In particular, an array of plasmonic dipole antenna of only a few micrometers long could reduce the amount of $TE_{00}$ mode by a factor of 50 with only 2.5% insertion loss in the $TE_{10}$ mode. It also has low optical feedback, below $10^{-4}$, low sensitivity to light wavelength, and ease of fabrication. It can be also used to filter out the $TE_{00}$ mode from a light delivery with a TE-to-TM polarization rotator.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
    a first waveguide portion configured to receive light from an energy source in a fundamental transverse electric ($TE_{00}$) mode;
    a spatial mode converter coupled to the first waveguide portion and configured to convert the light to a higher-order transverse electric ($TE_{10}$) mode;
    a second waveguide portion configured to receive the light at the $TE_{10}$ mode and deliver the light to a near-field transducer that heats a recording medium in response thereto; and
    an optical spatial mode filter that prevents the remnant $TE_{00}$ mode from affecting the recording performance while passing the light at the $TE_{10}$ mode.

2. The apparatus of claim 1, wherein the optical spatial mode filter comprises an array of dipole antennas in the second waveguide portion.

3. The apparatus of claim 2, wherein the array of dipole antennas is embedded in a cladding of the second waveguide portion.

4. The apparatus of claim 2, wherein the array of dipole antennas is embedded in a core of the second waveguide portion.

5. The apparatus of claim 2, wherein the array of dipole antennas is formed of elongated wires of plasmonic material each oriented parallel to the electric field direction.

6. The apparatus of claim 2, wherein the array of dipole antennas is periodic, having a periodicity near a first Bragg condition for the $TE_{00}$ mode.

7. The apparatus of claim 1, wherein the optical spatial mode filter comprises one of a periodic dielectric Bragg grating and a photonic crystal.

8. The apparatus of claim 1, wherein the optical spatial mode filter comprises a multimode interference splitter and combiner.

9. The apparatus of claim 1, wherein the optical spatial mode filter comprises a directional coupler comprising a splitter core spaced away from a core of the second waveguide portion.

10. The apparatus of claim 1, wherein the optical spatial mode filter comprises a long, lossy metallic wire spaced away from a core of the second waveguide portion.

11. An apparatus, comprising:
    a first waveguide portion configured to receive light from an energy source in a fundamental transverse electric mode ($TE_{00}$);
    a polarization rotator coupled to the first waveguide portion and configured to convert a portion of the light to transverse magnetic mode (TM);
    a second waveguide portion configured to receive the light at the TM mode and deliver the light to a near-field transducer that heats a recording medium in response thereto; and
    an array of dipole antennas in the second waveguide portion that prevents the remnant $TE_{00}$ mode from affecting the recording medium while passing the light at the TM mode.

12. The apparatus of claim 1, wherein the array of dipole antennas is embedded in a core of the second waveguide portion.

13. The apparatus of claim 11, wherein the array of dipole antennas is formed of elongated wires of plasmonic material each oriented parallel to the electric field of the $TE_{00}$ mode.

14. The apparatus of claim 11, wherein the array of dipole antennas is periodic, having a periodicity near a first Bragg condition for the fundamental $TE_{00}$ mode.

15. A method comprising:
receiving light at a first waveguide portion from an energy source in a fundamental transverse electric ($TE_{00}$) mode;
converting the light to higher-order transverse electric ($TE_{10}$) mode;
receiving the light at the $TE_{10}$ mode at a second waveguide portion and deliver the light to a near-field transducer that heats a recording medium in response thereto; and
optically filtering light in the $TE_{00}$ mode from the waveguide while passing the light at the $TE_{10}$ mode.

16. The method of claim 15, wherein the optical filtering is performed by an array of dipole antennas in the second waveguide portion.

17. The method of claim 15, wherein the array of dipole antennas is embedded in a cladding of the second waveguide portion.

18. The method of claim 15, wherein the array of dipole antennas is embedded in a core of the second waveguide portion.

19. The method of claim 15, wherein the array of dipole antennas is formed of elongated wires of plasmonic material each oriented in a cross-track direction.

20. The method of claim 15, wherein the array of dipole antennas is periodic, having a periodicity near a first Bragg condition for the $TE_{00}$ mode.

* * * * *